United States Patent [19]
Lee et al.

[11] Patent Number: 5,790,521
[45] Date of Patent: Aug. 4, 1998

[54] MARKING MECHANISM FOR CONTROLLING CONSECUTIVE PACKET LOSS IN ATM NETWORKS

[75] Inventors: Chaewoo W. Lee, Seoul, Rep. of Korea; Mark S. Andersland, Cedar Rapids, Iowa

[73] Assignee: The University of Iowa Research Foundation, Iowa City, Iowa

[21] Appl. No.: 624,897

[22] Filed: Mar. 27, 1996

Related U.S. Application Data

[63] Continuation-in-part of Ser. No. 283,698, Aug. 1, 1994, Pat. No. 5,629,936.

[51] Int. Cl.$^6$ .................................................. H04L 12/56
[52] U.S. Cl. .................................... 370/230; 370/232
[58] Field of Search .................................... 370/230, 231, 370/232, 234, 235, 253; 395/200.13

[56] References Cited

U.S. PATENT DOCUMENTS

| | | | |
|---|---|---|---|
| 4,769,811 | 9/1988 | Eckberg, Jr. et al. | 370/60 |
| 5,381,407 | 1/1995 | Chao | 370/233 |
| 5,390,299 | 2/1995 | Rege et al. | 395/250 |
| 5,400,329 | 3/1995 | Tokura et al. | 370/232 |
| 5,404,353 | 4/1995 | Ben-Michael et al. | 370/235 |
| 5,530,695 | 6/1996 | Dighe et al. | 370/232 |
| 5,633,859 | 5/1997 | Jain et al. | 370/234 |

OTHER PUBLICATIONS

Goldberg, Lee, "ATM silicon: ready for takeoff," Elect. Design., Apr. 1994, pp. 51–65.

Boyer, P.E., et al., "Spaced cells protects and enhances utilization of ATM links," IEEE Network, vol. 6, Sep. 1992, pp. 38–49.

Cidon, I., et al., "Analysis of packet loss processes in high-speed networks," IEEE Trans. Info. Theory, vol. 39, Jan. 1993, pp. 98–108.

Ferrandiz, J.M., et al., "Monitoring the packet gap of real-time packet traffic," Queueing Systems, vol. 12, 1992, pp. 231–242.

Li, S., "Study of Information loss in packet voice systems," IEEE Trans. Commun., vol. 37, (1989), pp. 1192–1202.

Petr, D.W., et al., "Priority discarding of speech in integrated packet networks," IEEE J. Select. Areas Commun., vol 7, (1989), pp. 644–656.

Petr, D.W., "End to end cell discarding analysis for ATM networks," Proc. IEEE INFOCOM 93, (1993), pp. 1178–1185.

Sidi, M., et al., "Congestion control through the input rate regulation," IEEE Trans. Commun., vol. 41, (Mar. 1993), pp. 471–477.

Yin, N., et al., "Implication of dropping packets from the front of the queue," IEEE Trans. Commun., vol. 41, (1992), pp. 846–851.

Ramaswami, V., et al., "Efficient traffic performance strategies for packet multipliers," Computer Networks and ISDN Systems 20, (1990), pp. 401–407.

*Primary Examiner*—Douglas W. Olms
*Assistant Examiner*—Min Jung
*Attorney, Agent, or Firm*—Fleshner & Kim

[57] ABSTRACT

An apparatus and method for optimal packet marking to control consecutive packet loss (also called "average packet gap") in a packet buffer. The apparatus and method can be used in a packet switched system having either a single or multiple packet class, as well as at any entry point of the packet switched system, e.g. source buffers, and switching node buffers. It is shown that variations of the disclosed packet marking method are optimal for either minimizing or maximizing the average packet gap.

14 Claims, 12 Drawing Sheets

Comparison of Average Virtual Gap

Comparison of Average Virtual Gap

MARKING MECHANISM FOR CONTROLLING CONSECUTIVE PACKET LOSS IN ATM NETWORKS

RELATED APPLICATIONS

This application is a continuation-in-part of U.S. patent application Ser. No. 08/283,698, filed Aug. 1, 1994, now U.S. Pat. No. 5,629,936, the contents of which are incorporated herein by reference.

BACKGROUND OF THE INVENTION

1. Field of the Invention

This invention relates to an apparatus and method for optimal packet marking to control consecutive packet loss (average packet gap) in a congested packet buffer. More generally, this invention relates to a method for marking packets to control consecutive packet loss for customers in service systems with finite buffers such as asynchronous transfer mode (ATM) networks.

2. Background of the Related Art

Feedback-based congestion controls generally react too slowly to regulate congestion in high-speed wide area networks, and hence, preventive controls that restrict cell admission, and enforce negotiated rates are essential. One preventive scheme that seems especially well suited for application in ATM networks is the so-called generalized leaky bucket scheme. The generalized leaky bucket scheme attempts to avoid congestion by imposing constraints on the average cell admission rate and maximum burst size, and of marking packets that violate these constraints for preferential discarding should they later encounter congestion. It is known to reduce both the variance of, and bursts in, admitted traffic and it is believed to reduce the probability of cell loss.

While the probability of cell loss is clearly an important measure of service quality, whether a given loss probability is acceptable depends on secondary measures such as the average number of consecutively lost cells, the so-called average packet gap. Consider, for instance, the relative performance of circuits that lose, respectively, one of every $10^6$ cells, and 100 consecutive cells in every $10^8$. Both circuits exhibit the same loss probability, yet intuitively, the first is better suited to real-time traffic (because even small gaps in voice cell streams produce distortion, while the second is better suited to data traffic (because less overhead is incurred when cells are retransmitted in blocks).

Regardless of whether the original information is real-time data (e.g. voice and video) requiring a minimum average packet gap, or traffic that uses retransmission to correct errors (e.g. certain types of computer data) requiring a maximum average packet gap, to improve session performance, it is desirable to employ a violation packet marking policy that controls the consecutive packet loss (average packet gap). No existing packet dropping policies is designed to control consecutive packet loss (average packet gap).

SUMMARY OF THE INVENTION

Accordingly, an object of the invention is to provide a circuit and method for optimal packet marking to control consecutive packet loss (average packet gap) in a packet buffer.

Another object of the invention is to provide a method and apparatus for marking violation cells to minimize the average number of consecutively lost cells or average packet gap when congestion occurs.

Another object of the invention is to provide a method and apparatus for marking violation cells to maximize the average number of consecutively lost cells or average packet gap when congestion occurs.

Another object of the invention is to mark violation cells to maximize the average packet gap created in data traffic when congestion occurs because less overhead is incurred when cells are retransmitted in blocks.

Another object of the invention is to mark violation cells to minimize the average packet gap created in real-time traffic such as voice or video cell streams when congestion occurs because large average cell gaps produce unacceptable distortion.

One advantage of the invention is that it minimizes or maximizes the average gap size by simply marking constraint violation cells.

Another advantage of the invention is that it minimizes or maximizes the average gap size with no loss of leaky bucket performance.

Another advantage of the invention is that it minimizes or maximizes the average gap size independent of the arrival distribution.

One feature of the invention is that it need not consider which cell to mark at the outset (i.e., it need not be initialized).

Another feature of the invention is that it can be shown to be optimal using the observation that optimizing the marking scheme is equivalent to minimizing or maximizing the Palm expectation of the number of consecutively marked cells.

Another feature of the invention is that its marking policy is independent of the contents of the cell.

Another feature of the invention is that it improves upon the prior art leaky bucket scheme.

These and other objects, advantages and features are accomplished by the provision of a method for controlling the average cell gap of traffic transported in asynchronous transfer mode on network, comprising the steps of: receiving a series of cells of said traffic at a first buffer; marking, prior to transmitting said series of cells, certain ones of said series of cells with a first token-type according to a predetermined scheme depending on whether said series violates specific burst or admission rate constraints; outputting said series of cells including said cells having said first token-type to the network, whereby cells other than said cells with the first token type should not be dropped and said cells having said first token-type may be dropped when those cells encounter congestion.

The above and other objects, advantages and features are further accomplished whereby said receiving step comprises receiving a series of cells of real-time type traffic and said marking step comprises marking certain ones of said series of cells according to a predetermined scheme when said series violates specific burst or admission rate constraints to minimize the average cell gap should the unmarked cells encounter congestion.

The above and other objects, advantages and features are further accomplished when said marking step comprises marking approximately every other cell of said series of cells, when the series violates specific burst or admission rate constraints.

The above and other objects, advantages and features are further accomplished when said receiving step comprises receiving a series of cells carrying voice data.

The above and other objects, advantages and features are also accomplished when said receiving step comprises receiving a series of cells of nonreal-time type traffic and said marking step comprises marking certain ones of said series of cells according to a predetermined scheme when the series violates specific burst or admission rate constraints, so as to maximize the average cell gap created should the marked cells be dropped due to congestion.

The above and other objects, advantages and features are also accomplished when said receiving step comprises receiving a series of cells of data type traffic and said marking step comprises marking certain ones of said series of cells according to a predetermined scheme when the series violates specific burst or admission rate constraints so as to maximize the average cell gap created should the marked cells be dropped due to congestion.

The above and other objects, advantages and features are also accomplished when said receiving step comprises receiving a series of cells of data type traffic and said marking step comprises marking certain ones of said series of cells according to a predetermined scheme which approximately maximizes the average cell gap.

The above and other objects and advantages will become clearer from the following detailed description of the preferred embodiments, taken in conjunction with the following drawings.

DETAILED DESCRIPTION OF THE PREFERRED EMBODIMENTS

This application concerns modification of the generalized leaky-bucket scheme to control the average cell gap as well as admission rate and burst size. The generalized scheme typically marks bandwidth violation cells for preferential discarding should they later encounter congestion. Once the decision to mark a cell is made, there is no consideration of which cell to mark. In fact, as long as a marking scheme admits the same fraction of marked and unmarked cells, the average gap length can be controlled without changing the average, peak, or burst performance. The problem of optimizing the marking policy is formulated as one of minimizing or maximizing the Palm expectation of the number of consecutively marked cells. It is then shown how, independent of the arrival distribution, and with no loss of leaky bucket performance, the average "virtual" gap size can be maximized or minimized by more cleverly marking overflow cells. The effectiveness of these methods are investigated by simulation. It is also shown that these embodiments of the invention reduce buffering delays in intermediate nodes.

2. The Queuing Model

Figure 1:
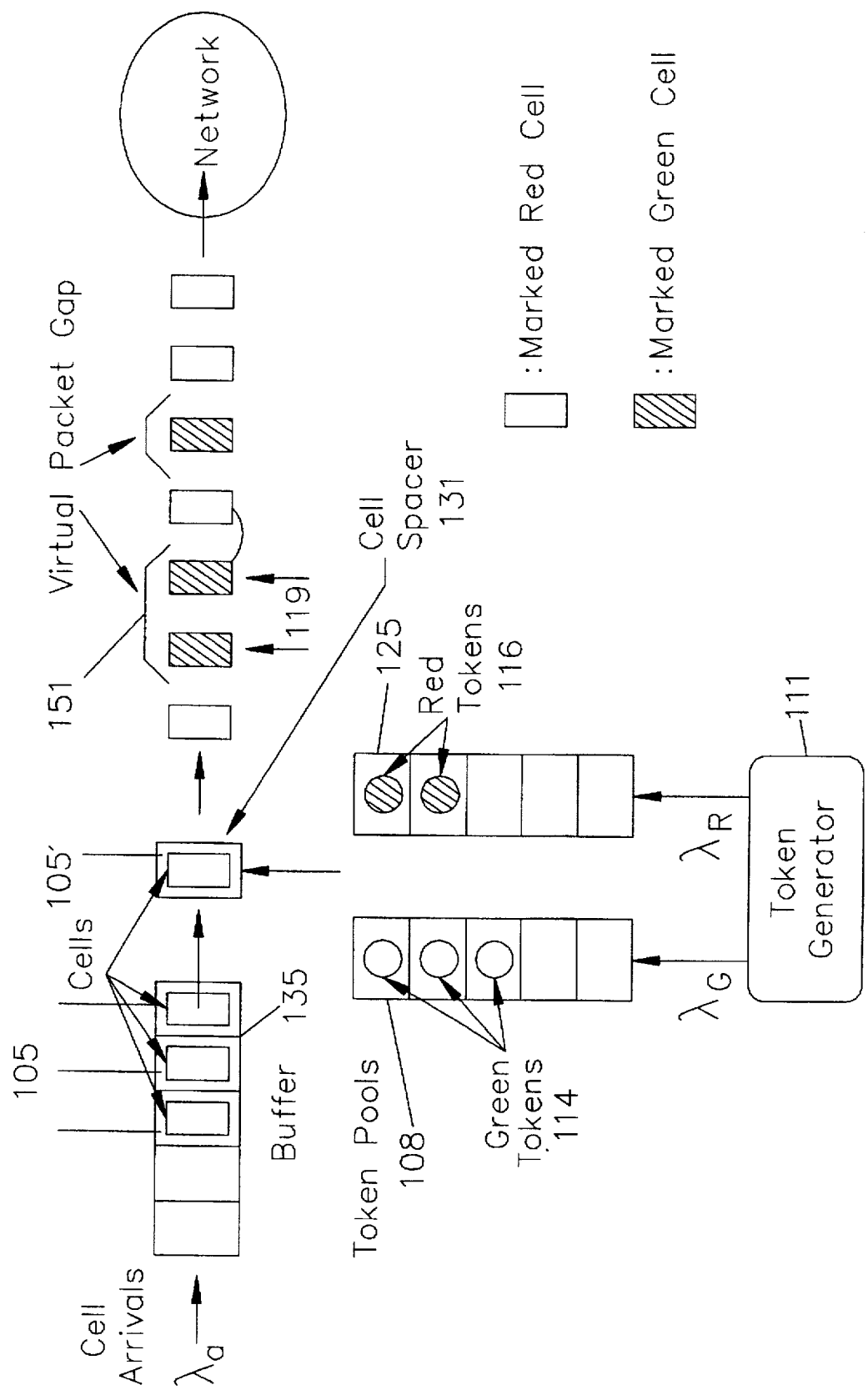
FIG. 1 shows a leaky bucket scheme.

The generalized leaky bucket scheme is depicted in FIG. 1. Under this scheme, user cells 105 are unconditionally admitted to the network when they can secure a token from their virtual circuit's green token pool 108. This green token pool 108 is replenished at a fixed rate (the contracted average admission rate) by token generator 111 and is of fixed size (the contracted maximum burst length). When no green tokens 114 are available (i.e., when a cell burst exceeds the contracted burst length) violation cells 119 may still be admitted provided that they can secure red tokens 116 from their virtual circuit's red token pool 125 (i.e., provided they are marked for preferential discarding in the event that they encounter congestion). This pool is also replenished at a fixed rate (the average violation cell admission rate) by token generator 111. When no tokens are available, or when the spacing between cells falls below a peak rate threshold, admission is blocked.

The key variables associated with this generalized leaky bucket are defined as follows:

$\alpha = \{\alpha_n\}_{n \in z}$—denotes the arrival times of cells to the buffer.

$d = \{d_n\}_{n \in z}$—denotes the departure times of cells from the buffer.

$\sigma$—denotes the sum of the cell spacing and transmission times.

$X_t(0)$—denotes the number of tokens in the green token pool at time $t^+$.

$X_t(1)$—denotes the number of tokens in the red token pool at time $t^+$.

$W_t$—denotes the buffered cells' cumulative workload at time t.

$Y_t$—denotes the number of buffered cells at time t.

B—denotes the cell buffer's capacity.

$C_G$—denotes the green token pool's capacity.

$C_R$—denotes the red token pool's capacity, $C_R = \infty$.

$Z_n$—denotes the marking (0=green, 1=red) of the cell departing at time $d_n$.

For simplicity, we will assume that $\sigma$ is constant, i.e., that cell spacer 131 is always operative.

Because the cell arrival process can be arbitrary and cell transmission is subject to token blocking, buffer 135 as a G/G/1/B queue, i.e., a single server queue with capacity B, a general service process, and general arrival process a. We assume that the arrival times $a=\{a_n\}_{n \in z}$ are ordered, defined on a common probability space $(\Omega;F;P)$, and indexed such that $a_0 \leq 0 < a_1$, that the arrival process has a finite, non-null intensity $\lambda^-{}_a = \Sigma_{n \in N} 1_{0 < a_n \leq 1}$, and that the arrival process is P-stationary ($1_A$ denotes the indicator function of A).

Suppose that, synchronous with 0, green tokens 114 and red tokens 116 are generated every $1 = \lambda_g$ and $1 = \lambda$, seconds respectively, and suppose that the state of the leaky bucket's token pools at time $t \in R$ is denoted by $X_t = (X_t(0); X_t(1)) \in N^2$. Because the total number of available tokens $X_t(0)+X_t(1)$ does not depend on the marking policy, independent of the overflow marking policy, the queue's right-continuous workload process $W_t$ satisfies the relation, $$W_t = \max\{0, W_{\alpha_n} + \sigma 1_{w_{\alpha_n}} \leq B\sigma - (t-\alpha_n) 1_{X_t(0) + X_t(1) > 0}\} \; t \in [\alpha_n d \; n, \alpha_{n+1}),$$

where $W_{t-}$ denotes $W_t$'s left-hand limit. It follows that all functions of $W_t$, including the times at which cells depart from the buffer 135, $d = \{d_n\}_{n \in z}$, $$d_n = \begin{cases} \inf\{t > d_{n-1} | W_t \in \{\sigma, 2\sigma, \ldots, B\sigma\}\} & n > 1 \\ \inf\{t > 0 | W_t \in \{\sigma, 2\sigma, \ldots, B\sigma\}\} & n = 1 \\ \sup\{t \leq 0 | W_t \in \{\sigma, 2\sigma, \ldots, B\sigma\}\} & n = 0 \\ \sup\{t < d_{n+1} | W_t \in \{\sigma, 2\sigma, \ldots, B\sigma\}\} & n < 0, \end{cases} \quad (2)$$

are independent of the marking policy.

Let $Z_n$ be an element of $\{0,1\}$ denote the marking (0=green, 1=red) of the cell 105' departing at time $d_n$. Then the sequence $\{d_n, Z_n\}$ where n is an integer, forms a marked point process. Let $g=\{g_n\}$ where n is an integer, denote the departure times at which the cell marking switches from green to red, i.e., $$g_n = \begin{cases} \inf\{d_m > g_{n-1} | Z_{m-1} = 0, Z_m = 1\} & n > 1 \\ \inf\{d_m > 0 | Z_{m-1} = 0, Z_m = 1\} & n = 1 \\ \sup\{d_m \leq 0 | Z_{m-1} = 0, Z_m = 1\} & n = 0 \\ \sup\{d_m < g_{n+1} | Z_{m-1} = 0, Z_m = 1\} & n < 0, \end{cases} \quad (3)$$

and let $h=\{h_n\}$ where n is an integer denote the departure times at which the cell marking switches from red to green, i.e., $$h_n = \inf\{d_m > g_n | Z_m = 0\}; \quad (4)$$

Then the cells 105 departing during the interval $[g_n; h_n)$ can be viewed as belonging to the nth virtual cell gap, i.e., the nth group of cells to be dropped should congestion occur.

Define the cell departure, the gap creation, and red marking rates to be, respectively, $$\lambda_d = E[\Sigma_{n \in N} 1_{0 < d_n \leq 1}], \; \lambda_h = E[\Sigma_{n \in N} 1_{0 < h_n \leq 1}], \; \text{and} \; \lambda_z = E[\Sigma_{n \in N} Z_n 1_{0 < h_n \leq 1}].$$

Define the leaky bucket's state to be $$S_t := (W_t, X_t) \in [0,(B+1)\sigma) \times \{0, \ldots, C_G\} \times 1N. \quad (5)$$

Then the class of admissible marking policies $\Gamma$ consists of all measurable mappings $\gamma$ from the leaky bucket's state and the previous departure's marking to the next departure's marking, such that the number of green tokens discarded by $\gamma$ in any interval $(t_0,t]$ is the same, for a given input cell stream, as would have been discarded under the generalized leaky bucket policy had both policies started from the same state, i.e., for all k $$\gamma:[0,(B+1)\sigma) \times \{0, \ldots, C_G\} \times 1N \times \{0,1\} \to \{0,1\}, \quad (6)$$

such that $$\sum_{n \in 1N} {}^1X_{\frac{n-}{\lambda_G}}(0) = C_G \lambda_0 <$$

$$\frac{n}{\lambda_G} \leq t = \sum_{n \in 1N} {}^1\tilde{X}_{\frac{n-}{\lambda_G}}(0) = C_G \lambda_0 < \frac{n}{\lambda_G} \leq t,$$

given that $S_{t_0} = \tilde{S}_{t_0}$, where $\tilde{S}_t = (\tilde{W}_t, \tilde{X}_t)$ denotes the state of the generalized leaky bucket. Hence, marking policies are identified that minimize or maximize the average virtual cell gap subject to the constraint that the new policy utilizes green tokens at the same rate as the conventional generalized leaky bucket. To this end a queuing process Lt is defined that counts the number of red cells that have departed since the departure of the last gap, i.e., let $$L_t = \sum_{m \in Z} \sum_{n \in Z} 1_{g_m < d_n \leq t} 1_{g_m < t \leq h_m}. \quad (7)$$

Now, fix $\gamma \in \Gamma$ and observe that at each cell departure time a virtual gap of length $L_{d_n}{}^\gamma$ is created. When $H^\gamma = \{h_n{}^\gamma\}_{n \in z}$ and $L^\gamma = \{L_t{}^\gamma\}_{t \in R}$ are P-stationary, and when $h^\gamma$ has finite non-null intensity $\gamma_{h\gamma}$, the average length of these departing gaps, as seen at virtual gap departure times, is the Palm expectation [3] of $L^\gamma$ with respect to $h^\gamma$, i.e., $$E_{h\gamma}^0[L_0{}^\gamma] = \frac{1}{\lambda_{h\gamma}} E\left[\sum_{n \in 1N} L_{h_n{}^\gamma}^\gamma 1_{0 < h_n{}^\gamma \leq 1}\right]. \quad (8)$$

It follows that when $h^\gamma$ and $L^\gamma$ are P-stationary for all $\gamma \in \Gamma$, and when $\lambda_a < \infty$ ($\to$ that $\lambda_{h\gamma} < \infty$ for all $\gamma \in \Gamma$), the virtual gap minimization and maximization problems reduce to minimizing or maximizing the Palm expectation $E_{h\gamma}{}^0[L_0{}^\gamma]$ over $\Gamma$ subject to the constraint that the new policy utilize green tokens at the same rate as the conventional generalized leaky bucket mechanism.

The Palm expectation of $Z^\gamma$, i.e., $E_d{}^0[Z_0{}^\gamma]$, denotes the probability that a departing cell is marked red. Thus the rate at which departing cells are marked red is $\lambda_z{}^\gamma = \lambda_d E_d{}^0[Z_0{}^\gamma]$. Using the queueing model, one can establish the following relationship between the virtual gap creation rate and the cell departure rate.

Lemma 1 The rate of virtual gap creations in the departure stream is $$\lambda_h{}^\gamma = \lambda_d E_d{}^0[Z_{-1}{}^\gamma (1-Z_0{}^\gamma)]. \quad (9)$$

Proof: $h_{(0,1]}{}^\gamma = \Sigma_{n \in \epsilon} 1_{0 < 21} \kappa_{\leq 1} Z_{n-1}{}^\gamma(1-Z_n{}^\gamma)$. Taking expectations on both sides, we have $E[h_{(0,1]}{}^\gamma = \Sigma_{n \in z} 1_{0 < t \leq 1} Z_{n-1}{}^\gamma] = \lambda_d E_d{}^0 [Z_{-1}{}^\gamma(1-Z_0{}^\gamma)]$.∎

It follows that $E_d{}^0[Z_{-1}{}^\gamma(1-Z_0{}^\gamma)]$ is the probability that a departure from the buffer ends a virtual gap. Accordingly we can define the average virtual gap creation rate and the average virtual gap length in the departure stream as $\lambda_h{}^\gamma = \lambda_d E_d{}^0[Z_{-1}{}^\gamma(1-Z_0{}^\gamma)]$ and $E_h{}^0{}_\gamma[L_0{}^\gamma]$, respectively. Similar results were derived in [7].

Because $h^\gamma$ and $L^\gamma$ are induced by measurable functions of $\{(W_t, X_t{}^\gamma), Z_t{}^\gamma\}$, the problem of minimizing or maximizing the average virtual gap length $E_h{}^\circ{}_\gamma[L_0{}^\gamma]$ is assured to be well posed when $\lambda_d<\infty$, and $\{(W_r,X_t{}^\gamma),Z_t{}^\gamma\}$ converges to a unique P stationary process for every $\gamma \in \Gamma$. Henceforth we will assume that this is the case.

In stationary systems, the expected "instantaneous rate of event cost accumulation" H, can often be shown to equal the product of the event rate A and the expected "cumulative cost" G associated with a typical event [8, 14]. In the present setting, where the events of interest are virtual gap creations, a similar "H=λG" relation can be shown to hold, namely, $\lambda_z = \lambda_h E_h{}^\circ[L_0{}^\gamma]$, i.e., the instantaneous rate of virtual gap length accumulation (the red cell marking rate $\lambda_z$) equals the product of the virtual gap creation rate $\lambda_h{}^\gamma$, and the expected virtual gap length (the Palm expectation of $L_0$). Thus, when the system is stationary, the gap creation rate and the average virtual packet gap in the departure stream are inversely proportional.

Theorem 1 For all $\gamma \in \Gamma$, when $\{(W_r,X_t{}^\gamma), Z_t{}^\gamma\}$ is P-stationary, $\lambda_z = \lambda_{h\gamma} E_h{}^\circ{}_\gamma[L_0{}^\gamma]$.

Proof: Under the Palm probability $P_h{}^\circ{}_\gamma$, the stationary marked point process $(h^\gamma,Z^\gamma)$ is synchronous, i.e., $h_0{}^\gamma=0$[3]. Because $Z_n{}^\gamma=0$, for $h_{-1}{}^\gamma \leq d_n < g_{-1}{}^\gamma$, and $Z_n{}^\gamma=1$, for $g_{-1}{}^{\gamma \leq d}{}_n < h_0{}^\gamma$, we have $$L_0{}^\gamma = \sum_{n \in \mathbf{Z}} 1_{g_{-1}{}^\gamma \leq d_n < 0} \qquad (10)$$

$$= \sum_{n \in \mathbf{Z}} Z_n{}^\gamma 1_{h_{-1}{}^\gamma \leq d_n < 0} \quad P^0_{h\gamma} a.s.$$

Taking Palm expectation on both sides, we have $$E^0_{h\gamma}[L_0{}^\gamma] = E^0_{h\gamma}\left[\sum_{n \in \mathbf{Z}} Z_n{}^\gamma 1_{h_{-1}{}^\gamma \leq d_n < 0}\right] \qquad (11)$$

$$= E^0_{h\gamma}\left[\sum_{n \in \mathbf{Z}} Z_n{}^\gamma 1_{0 \leq d_n < h_1{}^\gamma}\right]$$

where the second equality follows from the stationarity. Applying the exchange formula [3] between d and h, we have $$\lambda_d E_d{}^0[Z_0] = \lambda_h{}^\gamma E^0_{h\gamma}\left[\sum_{n \in \mathbf{Z}} Z_n{}^\gamma 1_{0 \leq d_n < h_1{}^\gamma}\right] \qquad (12)$$

$$= \lambda_h{}^\gamma E^0_{h\gamma}[L_0{}^\gamma].$$

However, $\lambda_d E_d{}^0[Z_0]=\lambda_z$. Thus we have $\lambda_z = \lambda_h{}^\gamma E_h{}^\circ{}_\gamma[L_0{}^\gamma]$. ∎

By assumption $\lambda_z$ is policy independent, hence for stationary processes it is constant. Thus, the average virtual gap creation rate and the average virtual cell gap length are inversely proportional.

4. Virtual gap minimization

Theorem 1 implies that the average virtual cell gap and the net virtual cell gap creation rate are inversely proportional. It follows that to minimize the average virtual cell gap $E_h{}^\circ{}_\gamma[L_0{}^\gamma]$ it suffices to maximize the net virtual cell gap creation rate $\lambda_h{}^\gamma$. In this section we prove that the marking policy given below minimizes the average virtual cell gap. Later, we develop the analogous gap maximization result and we show that when the proposed marking policies are applied, the average delay incurred by cells is less than that incurred under the generalized leaky bucket mechanism.

The generalized leaky bucket mechanism always assigns green tokens 114 to cells 105 whenever green tokens 114 exist in the green token pool 108. Our marking policy allows for more flexible markings, yet it ensures that green tokens 114 are assigned to departing cells 131 at the same rate as the generalized leaky bucket mechanism. The basic idea underlying our policy is to alternate the assignment of green tokens 114 and red tokens 116 whenever possible, i.e., to assign green tokens 114 to departing cells wherever surplus green tokens 114 exists in green token pool 108 and to alternate the assignment of green tokens 114 and red tokens 116 whenever an impending shortage of green tokens 114 is detected. Because the token generation times are deterministic these shortages can be predicted with certainty, hence substituting red tokens 116 for green tokens 114 does not reduce the net green token utilization, because the issuance of these red tokens 116, at some time, is unavoidable.

The advantage of alternating the assignment of red tokens 116 and green tokens 114 when impending green token shortages are detected is that this policy increases the gap creation rate and hence, by Theorem 1, decreases the average virtual gap size. Let f1* denote our marking policy and let Pt denote the number of green tokens to be generated during the interval (t; t+Wt] plus the number of tokens in the green token pool. Then our marking policy takes the form $$Z_n^* = \begin{cases} 0 & P_{d_n}^{} \geq Y_{d_n}^- \text{ OR } [X_{d_n}^{}(0)>0, Z_{d_n}^{}=1] \text{ OR } X_{d_n}^{}(1)=0 \\ 1 & [X_{d_n}^{}(1)>0, Z_{d_n}^{}=0, P_{d_n}^{}<Y_{d_n}^-] \text{ OR } X_{d_n}^{}(0)=0 \end{cases}$$

Figure 2:
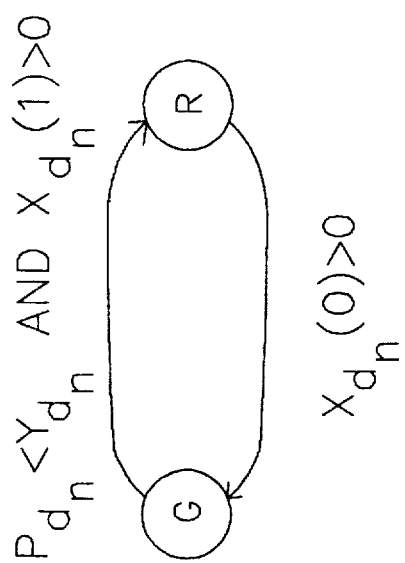
FIG. 2 shows a state transition diagram for the minimum virtual gap policy.

The policy's transition diagram is shown in FIG. 2. The states indicate the token colors assigned to the departing cell. Initially the policy can be at any state.

Let $G^\gamma_{(t_0,t]}$ and $R^\gamma_{(t^0,t]}$ be queueing processes that count, respectively, the number of green tokens drawn from the green token pool and the number of red tokens drawn from the red token pool during the interval $(t_0, t]$ under $\gamma \in \Gamma$. Observe first that, over any interval, the sum of the green and red tokens consumed, i.e., the total number of departed cells, is policy independent, because the total number of departed is policy independent. Thus for all departure times and for all $\gamma \in \Gamma$ $$G^\gamma_{(t_0,d_k]} R^\gamma_{(t_0,d_k]} = G^\gamma_{(t_0,d_k]} + R^\gamma_{(t_0,d_k]}. \qquad (14)$$

The following lemmas establish two properties satisfied by the leaky bucket under policy γ* when consecutive cell departures are marked green or red.

Lemma 2 When under λ*, and any $\gamma \in \Gamma$, the leaky bucket is in the same state at time $t_0$.

(a) If cells departing at $d_{k-1}$ and $d_k$ take green tokens, then $$G^{\gamma*}_{(t_0,d_{k-1}]} \leq G^\gamma_{(t_0,d_{k-1}]} \text{ and } G^{\gamma*}_{(t_0,d_k]} \leq G^\gamma_{(t_0,d_k]}.$$

(b) If cells departing at $d_{k-1}$ and $d_k$ take red tokens, then $$G^{\gamma*}_{(t_0,d_{k-1}]} \geq G^\gamma_{(t_0,d_{k-1}]} \text{ and } G^{\gamma*}_{(t_0,d_k]} \geq G^\gamma_{(t_0,d_k]}.$$

Proof: For all departure times $G^{\gamma*}_{(t^0,d_k]}+R^{\gamma*}_{t_0,d_k]}=G^\gamma_{(t_0,d_k]}+R^\gamma_{(t_0,d_k]}$. Observe first that, at time $d_k$, the sum of green tokens consumed, and the number of green tokens to be generated during the interval $(d_k, d_k+W_{d_k}]$ plus the number of green tokens in the green token pool, is the same under both γ* and γ, because by assumption, starting from the same state, the number of green tokens discarded during the interval $(d_k, d_k+W_{d_k}]$, must be the same for all $\gamma \in \Gamma$. Thus we have $$G^{\gamma*}_{t_0,d_k]}+P^{\gamma*}_{D_k}=G^\gamma_{(t_0,d_k]}+P^\gamma_{d_k}. \qquad (15)$$

(a) Under γ*, departing cells take green tokens consecutively only if either: (i) there are no red tokens in the token pool, or (ii) a surplus of green tokens is expected. Since red tokens are never discarded (because the red token buffer is infinite), when there are no red tokens in the token buffer under $\gamma^*$, no other policies consume more red tokens than $\gamma^*$ does. Therefore $Rr_{(t_0,d_{k-1})}^{\gamma} \geq R^{\gamma}_{(t_0,d_{k-1})}$ and $R^{\gamma}_{(t_0,d_k)\geq R}^{\gamma}{(t_0,d_k)}$. Hence the inequality follows from (14). Since, starting from the same state, all policies in $\Gamma$ discard the same number of green tokens, when a surplus of green tokens is expected at time $d_{k-1}^-$, no other policy can have larger $P_{d_{k-1}}$ than $\gamma^*$ does because postponing the use of green tokens would result in additional green token discards. Therefore, $P_{d_{k-1}}^{\gamma^*} \geq P_{d_{k-1}}^{\gamma}$ and $P_{d_k}^{\gamma^*} \geq P_{d_k}^{\gamma}$. Hence the inequality follows from (15).

(b) When, under $\gamma^*$, departing cells take red tokens consecutively, there are no green tokens in the token pool. Because, starting from the same state, all policies in $\Gamma$ discard the same number of green tokens, this implies that no other policy consumes more green tokens than $\gamma^*$. Hence, the inequality follows.

Lemma 3 For all $\gamma \in \Gamma$, and for all realizations of the arrival process $\{a_n\}$, given that $\gamma$ and $\gamma^*$ are at the same state at times $t_0 = Q$ and $t = h_{n-1}^{\gamma} \geq h_{n-1}^{\gamma^*}$, the following inequalities hold:

$$G_{(t_0,h_n\eta)}^{\gamma} \geq G_{(t_0,h_n\eta)}^{\gamma^*} \text{ and } R_{(t_0,h_n\eta)}^{\gamma} \geq R_{(t_0,h_n\eta)}^{\gamma^*} \qquad (16)$$

Proof: Since $\gamma$ and $\gamma^*$ are in the same state at time $h_{n-1}^{\gamma}$, i.e., $\gamma$ and $\gamma^*$ have same number of green tokens and red tokens, they should consume same number of green and red tokens. Hence, $$G_{(t_0,h_{n-1})}^{\gamma} = G_{(t_0,h_{n-1})}^{\gamma^*} \text{ and } R_{(t_0,h_{n-1})}^{\gamma} = R_{(t_0,h_{n-1})}^{\gamma^*} \qquad (16)$$

There are three cases to consider.

(i) When $h_n^{\gamma^*} \leq h_{n-1}^{\gamma}$, from (17)

$$G_{(adi\, 0,h_n\eta)}^{\gamma} \geq G_{(t_0,h_{n-1})}^{\gamma} = G_{(t_0,h_{n-1})}^{\gamma^*} \geq G_{T_0,h_n}^{\gamma^*}, \qquad (18)$$

and $$R_{(t_0,h_n\eta)}^{\gamma} \geq R_{(t_0,h_{n-1})}^{\gamma} = R_{(t_0,h_{n-1})}^{\gamma^*} \geq R_{(t_0,h_n)}^{\gamma^*}.$$

(i) When $d_n^{\gamma^*} \leq h_{n-1}^{\gamma} \leq h_n^{\gamma^*}$, $G_{g_n^{\gamma},h_n}^{\gamma^*} = G_{(h_{n-1}^{\gamma},h_n)}^{\gamma^*} = 1 \leq G_{(h_{n-1}^{\gamma},h_n)}^{\gamma}$. Hence, $$G_{(t_0,h_n)}^{\gamma} = G_{(t_0,h_{n-1})}^{\gamma} + G_{(h_{n-1}^{\gamma},h_n)}^{\gamma} \geq 24\, G_{(t_0,h_{n-1})}^{\gamma^*} + G_{(h_{n-1}^{\gamma},h_n)}^{\gamma^*} = G_{(t_0,h_n)}^{\gamma^*}. \qquad (19)$$

Because $\gamma^*$ assigns a green token as soon as green tokens are available after $g_n^{\gamma^*}$, and because $\gamma$ and $\gamma^*$ are in the same state at time $h_{n-1}^{\gamma}$, $R_{(h_{n-1}^{\gamma},h_n)}^{\gamma^*} \leq R_{(h_{n-1}^{\gamma},h_n)}^{\gamma}$. Hence $$R_{(t_0,h_n)}^{\gamma} = R_{(t_0,h_{n-1})}^{\gamma} + R_{(h_{n-1}^{\gamma},h_n)}^{\gamma} 24$$
$$R_{(t_0,h_{n-1})}^{\gamma^*} + R_{(h_{n-1}^{\gamma},d_n)}^{\gamma^*} = R_{(t_0,h_n)}^{\gamma^*}. \qquad (20)$$

(iii) When $g_n^{\gamma^*} > h_{n-1}^{\gamma}$, this and the condition $h_{n-1}^{\gamma} \geq h_{n-1}^{\gamma^*}$ imply that both $\gamma$ and $\gamma^*$ assign green tokens at time $h_{n-1}^{\gamma}$. Because $\gamma$ and $\gamma^*$ are in the same state at time $h_{n-1}^{\gamma}$, and because $\gamma^*$ assigns red tokens whenever green token shortages are expected, $g_n^{\gamma^*} \leq g_n^{\gamma}$ and $G_{(h_{n-1}^{\gamma},g_n)}^{\gamma^*} \leq G_{(h_{n-1}^{\gamma},g_n)}^{\gamma}$. Using the relation $G_{(h_{n-1}^{\gamma},h_n)}^{\gamma^*} = G_{(h_{n-1}^{\gamma},g_n)}^{\gamma^*} + 1$ and $G_{(h_{n-1}^{\gamma},h_n)}^{\gamma} = G_{(h_{n-1}^{\gamma},g_n)}^{\gamma} + 1$, we have $$G_{(t_0,h_n)}^{\gamma} = G_{(t_0,h_{n-1})}^{\gamma} + G_{(h_{n-1})}$$

If $g_n^{\gamma^*} = g_n^{\gamma}$, $\gamma$ and $\gamma^*$ are in the same state at time $g_n^{\gamma}$. Because $\gamma^*$ assigns a green token as soon as green tokens are available after time $g_n^{\gamma^*}$, and $\gamma$ and $\gamma^*$ are in the same state at $g_n^{\gamma^*}$. $R_{(g_n^{\gamma},h_n)}^{\gamma^*} \leq R_{(g_n^{\gamma},h_n)}^{\gamma}$. If $g_n^{\gamma^*} < g_n^{\gamma}$, because $\gamma$ and $\gamma^*$ are at the same state at time $h_{n-1}^{\gamma}$ and both $\gamma$ and $\gamma^*$ assign green tokens at time $h_{n-1}^{\gamma}$, at time $g_n^{\gamma}$, $\gamma$ should consume more green tokens than $\gamma^*$. This implies that at the next departure time after $g_n^{\gamma^*}$, $\gamma^*$ can assign a green token. Therefore, $R_{g_n^{\gamma},h_n}^{\gamma^*} = 1 \leq R_{(g_n^{\gamma},h_n)}^{\gamma}$. Hence, $$R_{(t_0,h_n)}^{\gamma} = R_{(t_0,s_{n-1})}^{\gamma} + R_{(s_{n-1},h_n)}^{\gamma} \geq R_{(t_0,s_{n-1})}^{\gamma^*} + R_{(s_n,h_n)}^{\gamma^*} = R_{(t_0,h_n)}^{\gamma^*}. \qquad (22)$$

The following theorem establishes that $\gamma^*$ is the unique marking policy in $\Gamma$ minimizing the gap occurrence rate for all arrival processes. It follows, by Theorem 1, that $\gamma^*$ minimizes the average virtual gap.

Theorem 2 For all $\gamma \in \Gamma$, and for all realizations of the arrival process $\{a_n\}$, given that $\gamma$ and $\gamma^*$ are at the same state at $t_0 = 0$ $$\sum_{n \in 1N} 1_{\{h_n^{\gamma^*} \leq 1\}} \geq \sum_{n \in 1N} 1_{\{h_n^{\gamma} \leq 1\}}, \qquad (23)$$

with strict inequality for some arrival process.

Proof: Because the times at which cells depart are policy independent, to establish (23) it suffices to prove that starting from the same initial state $S_0$ and the same last marking $Z_0$, $$h_m^{\gamma} \geq h_m^{\gamma^*} \text{ for all } m \in 1N, \qquad (24)$$

with strict inequality for some arrival process.

Let $\delta_{(t_0,t]}$ denote the amount of time that a server is idle during the interval $(t_0, t]$, when there are either no cells to serve or no tokens to draw. To prove that (24) holds it suffices to show that for all $m \in 1N$, $$h_m^{\gamma} = (G_{t_0,h_m}^{\gamma} - G_{t_0,h_m^*}^{\gamma^*})\sigma + (R_{t_0,h_m}^{\gamma} - R_{t_0,h_m^*}^{\gamma^*})\sigma + \delta_{(t_0,h_m]}^{\gamma} + h_m^{\gamma^*}, \qquad (25)$$

$$(G_{t_0,h_m}^{\gamma} - G_{t_0,h_m^*}^{\gamma^*}) \geq 0, \text{ and } (R_{t_0,h_m}^{\gamma} - R_{t_0,h_m^*}^{\gamma^*}) \geq 0. \qquad (26)$$

To see this note that, because $G_{(t_0,t]} + R_{(t_0,t]}$ (the total number of departures in $(t_0, t]$) is policy independent, (26) implies that $h_m^{\gamma^*} \leq h_m^{\gamma}$. Hence (25)–(26) imply that the first three terms on the right hand side of (25) are non-negative, and the result follows.

We prove (25)–(26) by induction on m. Because the time required to send a cell is $\sigma$ and, without loss of generality, we can assume that $g_1^{\gamma} > 0$, for $m = 1$, we can write $h_1^{\gamma}$ as $$h_1^{\gamma} = (G_{(t_0,h_1)}^{\gamma} + R_{(t_0,h_1)}^{\gamma})\sigma + \delta_{(t_0,h_1]}, \qquad (27)$$

and $h_1^{\gamma^*}$ as $$h_1^{\gamma^*} = (G_{(t_0,h_1)}^{\gamma^*} + R_{(t_0,h_1)}^{\gamma^*})\sigma + \delta_{(t_0,h_1^*)}. \qquad (28)$$

Subtracting (28) from (27), we get $$h_1^{\gamma} = (G_{(t_0,h_1)}^{\gamma} - G_{(t_0,h_1)}^{\gamma^*})\sigma + (R_{(t_0,h_1)}^{\gamma} - r_{(t_0,h_1)}^{\gamma^*})\sigma + \delta_{(h_1^{\gamma},h_1]} + h_1^{\gamma^*}. \qquad (29)$$

Because $\gamma$ and $\gamma^*$ are in the same state at time 0, by Lemma 3

$$(G_{(t_0,h_1]}\eta^\gamma - G_{(t_0,h_1]}r_1^{\gamma^*}) \geq 0, \text{ and } (R_{(t_0,h_1]}\eta^\gamma - R_{(t_0,h_1]}r_1^{\gamma^*}) \geq 0. \tag{30}$$

To complete the proof it suffices to show that $$h_{m-1}^\gamma = (G'_{(t_0,h\bar{m}-1]} - G^*_{(t_0,h\bar{m}-1]})\sigma + \tag{31}$$

$$(R'_{(t_0,h\bar{m}-1]} - R^*_{(t_0,h\bar{m}-1]})\sigma + \delta_{(h\bar{m}-1,h\bar{m}-1]} + h^*_{m-1},$$

$$(G'_{(t_0,h\bar{m}-1]} - G^*_{(t_0,h\bar{m}-1]}) \geq 0, \text{ and } (R'_{(t_0,h\bar{m}-1]} - R^*_{(t_0,h\bar{m}-1]}) \geq 0. \tag{32}$$

imply that $$h_m^\gamma = (G'_{(t_0,h_m]} - G^*_{(t_0,h^*_m]})\sigma + (R'_{(t_0,h_m]} - R^*_{(t_0,h^*_m]})\sigma + \delta_{(h^*_m,h_m]} + h^*_m. \tag{33}$$

$$(G'_{(t_0,h_m]} - G^*_{(t_0,h^*_m]}) \geq 0, \text{ and } (R'_{(t_0,h_m]} - R^*_{(t_0,h^*_m]}) \geq 0. \tag{34}$$

Observe first that, because $$h_m^\gamma = (G_{(t_0,h_m]}\eta^\gamma + R_{(t_0,h_m]}\eta^\gamma)\sigma + \delta_{(t_0,h_m]} \tag{35}$$

and $$h_m^{\gamma^*} = (G_{(t_0,h_m]}r_1^{\gamma^*} + R_{(t_0,h_m]}r_1^{\gamma^*})\sigma + \delta_{(t_0,h_m]}, \tag{36}$$

(33) follows by subtraction.

Depending on the number of green tokens and red tokens consumed during $(h_{m-1}^{\gamma^*}, h_m^{\gamma^*}]$, there are four cases to consider.

Case 1: $G_{(h_{m-1}^{\gamma^*},h_m^{\gamma^*}]}r_1^{\gamma^*}=1$ and $R_{(h_{m-1}^{\gamma^*},h_m^{\gamma^*}]}r_1^{\gamma^*}=1$.
In this case $G_{(t_0,h_m]}r_1^{\gamma^*}=G_{(t_0,h_{m-1}]}r_1^{\gamma^*}+1$ and $R_{(t_0,h_m]}r_1^{\gamma^*}=R_{(t_0,h_{m-1}]}r_1^{\gamma^*}+1$. Since $G_{(t_0,h_m]}\eta^\gamma \geq G_{(t_0,h_{m-1}]}\eta^\gamma+1$ and $R_{(t_0,h_m]}\eta^\gamma \geq R_{(t_0,h_{m-1}]}\eta^\gamma+1$, we have $$G_{(t_0,h_m]}\eta^\gamma \geq G_{(t_0,h_{m-1}]}\eta^\gamma+1 \geq G_{(t_0,h_{m-1}]}r_1^{\gamma^*}+1 = G_{(t_0,h_m]}r_1^{\gamma^*},$$

and $$R_{(t_0,h_m]}\eta^\gamma \geq R_{(t_0,h_{m-1}]}\eta^\gamma+1 = R_{(t_0,h_m]}r_1^{\gamma^*}.$$

Thus (34) holds.
Case 2: $G_{(h_{m-1}^{\gamma^*},h_m^{\gamma^*}]}r_1^{\gamma^*}=1$ and $R_{(h_{m-1}^{\gamma^*},h_m^{\gamma^*}]}r_1^{\gamma^*}>1$.

Since, just as (26) implies that $h_m^{\gamma^*} \leq h_m^\gamma$, (34) implies that $h_m^{\gamma^*} \leq h_m^\gamma$. There are three subcases to consider.

(2-i). Suppose $h_{m-1}^\gamma = h_{m-1}^{\gamma^*}$. (32) implies that $G_{(t_0,h_{m-1}]}\eta^\gamma = G_{(t_0,h_{m-1}]}r_1^{\gamma^*}$ and by (14), that $R_{(t_0,h_{m-1}]}\eta^\gamma = R_{(t_0,h_{m-1}]}r_1^{\gamma^*}$. Hence, $\gamma$ and $\gamma^*$ are in the same state at time $h_{m-1}^\gamma$. Thus, by Lemma 3, (34) holds.

(2-ii). Suppose $h_{m-1}^{\gamma^*} < g_m^{\gamma^*} \leq h_{m-1}^\gamma < h_m^{\gamma^*} = d_k$. Because the cells departing under $\gamma^*$ at times $[g_m^{\gamma^*}, d_k]$ take red tokens, by Lemma 2-(b), $$G_{(t_0,h_{m-1}]}\eta^\gamma \leq g_{(t_0,h_{m-1}]}^{\gamma^*}. \tag{37}$$

From (32) we have $$G_{(t_0,h_{m-1}]}\eta^\gamma \leq G_{(t_0,h_{m-1}]}r_1^{\gamma^*}. \tag{38}$$

But, since $\gamma^*$ takes only red tokens during the interval $(h_{m-1}^{\gamma^*}, h_{m-1}^\gamma]$, $$G_{(t_0,h_{m-1}]}r_1^{\gamma^*} = G_{(t_0,h_{m-1}]}r_1^{\gamma^*}. \tag{39}$$

(37)–(39) imply that $G_{(t_0,h_{m-1}]}\eta^\gamma = G_{(t_0,h_{m-1}]}r_1^{\gamma^*}$, and by (14), that $R_{(t_0,h_{m-1}]}\eta^\gamma = R_{(t_0,h_{m-1}]}r_1^{\gamma^*}$. Hence, once again, $\gamma$ and $\gamma^*$ are in the same state at time $h_{m-1}^\gamma$, and thus, by Lemma 3, (34) holds.

(2-iii). Suppose $h_m^{\gamma^*} = d_k \leq h_{m-1}^\gamma$. Because $\gamma^*$ takes red tokens at times $d_{k-2}$ and $d_{k-1}$, by Lemma 2-(b) and (14), $$R_{(t_0,d_{k-1}]}r_1^{\gamma^*} \leq R_{(t_0,d_{k-1}]}\eta^\gamma. \tag{40}$$

But, because $d_k$ is, by hypothesis, assigned a green token under $\gamma^*$, and $d_{k-1} < h_{m-1}^\gamma$, $R_{(t_0,d_{k-1}]}r_1^{\gamma^*} = R_{(t_0,h_m]}r_1^{\gamma^*}$ and $R_{(t_0,d_{k-1}]}\eta^\gamma \leq R_{(t_0,h_{m-1}]}\eta^\gamma < R_{(t_0,h_m]}\eta^\gamma$. Hence, $$R_{(t_0,h_m]}\eta^\gamma > R_{(t_0,h_m]}r_1^{\gamma^*}. \tag{41}$$

Since, by hypothesis, $G_{(h_{m-1}^{\gamma^*},h_m^{\gamma^*}]}r_1^{\gamma^*}=1$, $$G_{(t_0,h_m]}\eta^\gamma \geq G_{(t_0,h_m]}r_1^{\gamma^*}. \tag{42}$$

Thus, (34) holds.
Case 3: $G_{(h_{m-1}^{\gamma^*},h_m^{\gamma^*}]}r_1^{\gamma^*}>1$ and $R_{(h_{m-1}^{\gamma^*},h_m^{\gamma^*}]}r_1^{\gamma^*}=1$.
There are two subcases to consider.

(3-i). Suppose $h_{m-1}^{\gamma^*} \leq h_{m-1}^\gamma < g_m^{\gamma^*} = d_p$. Because the cells departing under $\gamma^*$ at times between $h_{m-1}^{\gamma^*}$ and $d_{p-1}$ take green tokens, by Lemma 2-(a)

$$G_{(t_0,h_{m-1}]}\eta^\gamma \geq G_{(t_0,h_{m-1}]}r_1^{\gamma^*}. \tag{43}$$

Moreover, we can express the time $h_{m-1}^\gamma$ as $$h_{m-1}^\gamma = (G^*_{(t_0,h\bar{m}-1]} - G^*_{(t_0,h\bar{m}-1]})\sigma + \delta_{(h\bar{m}-1,h\bar{m}-1]} + \tag{44}$$
$$h^*_{m-1} \leq$$
$$(G'_{(t_0,h\bar{m}-1]} - G^*_{(t_0,h\bar{m}-1]})\sigma + \delta_{(h\bar{m}-1,h\bar{m}-1]} + h^*_{m-1}.$$

However, by (31)

$$h_{m-1}^\gamma \geq (G_{(t_0,h_{m-1}]}\eta^\gamma - G_{(t_0,h_{m-1}]}r_1^{\gamma^*})\sigma + \delta_{(h_{m-1}^{\gamma^*},h_{m-1}^\gamma]} + h_{m-1}^{\gamma^*}. \tag{45}$$

(43)–(45) imply $G_{(t_0,h_{m-1}]}\eta^\gamma = G_{(t_0,h_{m-1}]}r_1^{\gamma^*}$ and by (14), that $R_{(t_0,h_{m-1}]}\eta^\gamma = R_{(t_0,h_{m-1}]}r_1^{\gamma^*}$. Hence, once again, $\gamma$ and $\gamma^*$ are in the same state at time $h_{m-1}^\gamma$, and thus, by Lemma 3, (34) holds.

(3-ii). Suppose $g_m^{\gamma^*}=d_p \leq h_{m-1}^\gamma$. At time $d_{p-1}$, $G_{(t_0,d_{p-1}]}\eta^\gamma \geq G_{(t_0,d_{p-1}]}r_1^{\gamma^*}$. This implies $$G_{(t_0,h_m]}\eta^\gamma \geq G_{(t_0,h_{m-1}]}\eta^\gamma+1 \geq g_{(t_0,d_{p-1}]}r_1^{\gamma^*}+1 \geq G_{(t_0,d_{p-1}]}r_1^{\gamma^*}+1 = G_{(t_0,h_m]}r_1^{\gamma^*}.$$

and by hypothesis, $R_{H_{m-1}^{\gamma^*},h_m^{\gamma^*}]}r_1^{\gamma^*}=1$, hence, $$R_{(t_0,h_m]}\eta^\gamma \geq R_{(t_0,h_{m-1}]}\eta^\gamma+1 \geq R_{(t_0,h_{m-1}]}r_1^{\gamma^*}+1 = R_{(h_{m-1}^{\gamma^*},h_m^{\gamma^*}]}r_1^{\gamma^*}.$$

Thus, (34) holds.
Case 4: $G_{(h_{m-1}^{\gamma^*},h_m^{\gamma^*}]}r_1^{\gamma^*}>1$ and $R_{(h_{m-1}^{\gamma^*},h_m^{\gamma^*}]}r_1^{\gamma^*}>1$.
There are three subcases to consider.

(4-i). Suppose $h_{m-1}^{\gamma^*} \leq h_{m-1}^\gamma < g_m^{\gamma^*} = d_p < h_m^{\gamma^*}$. This case is exactly the same as the case (3-i). It follows that $\gamma$ and $\gamma^*$ are in the same state at time $h_{m-1}^\gamma$. Thus, by Lemma 3, (34) holds.

(4-ii). Suppose $g_m^{\gamma^*}=d_p \leq h_{m-1}^\gamma < h_m^{\gamma^*} = d_k$. Because the cells departing under $\gamma^*$ at times between $h_{m-1}^{\gamma^*}$ and $d_{p-1}$ take green tokens, by Lemma 2-(a), at time $d_{p-1}$ $$G_{(t_0,d_{p-1}]}\eta^\gamma \geq G_{(t_0,d_{p-1}]}r_1^{\gamma^*}, \tag{46}$$

and because the cells departing under $\gamma^*$ at times between $d_p$ and $d_{k-1}$ take red tokens, 2-(b), at time $h_{m-1}^\gamma$, $$G_{(t_0,h_{m-1}]}\eta^\gamma \leq G_{(t_0,h_{m-1}]}r_1^{\gamma^*}. \tag{47}$$

But, since $\gamma^*$ takes only red tokens during interval $[d_p, h_{m-1}{}^\gamma]$, $$G_{(t_0, h_{m-1}{}^\gamma]}{}^{\gamma^*} = G_{(t_0, d_{p-1}]}{}^{\gamma^*} \qquad (48)$$

and $$G_{(t_0, h_{m-1}{}^\gamma]}{}^\gamma > G_{(t_0, d_{p-1}]}{}^{\gamma^*}. \qquad (49)$$

Since (49) contradicts (46)–(48), this case does not occur.

(4-iii). Suppose $h_{m-1}{}^\gamma \geq h_m{}^{\gamma^*} = d_k$. At time $d_{k-1}$, applying the same argument used in the case (2-iii), we have $$R_{(t_0, h_m{}^\gamma]}{}^\gamma > R_{(t_0, h_m{}^{\gamma^*}]}{}^{\gamma^*}. \qquad (50)$$

At time $d_{p-1}$, applying the same argument used in the case (3-11), we have $$G_{(t_0, h_m{}^\gamma]}{}^\gamma \geq G_{(t_0, h_m{}^{\gamma^*}]}{}^{\gamma^*}. \qquad (51)$$

Thus, (34) holds.

The desired inequality follows by induction.

To see that the inequality is strict for some arrival process, suppose that $h_{k-1}{}^\gamma \geq h_k{}^{\gamma^*}$ for some k, then there is no opportunity to set $h_m{}^\gamma$ equal to $h_k{}^{\gamma^*}$ in the future. ∎

5. Gap Maximization

The arguments used to minimize the average virtual cell gap are equally applicable to average virtual cell gap maximization. The basic idea is to avoid changing token color whenever possible, i.e., once a green token is assigned, our policy assigns green tokens to all departing cells until the green token pool empties, once a red token is assigned, red tokens are assigned to all departing cells until either the red token pool empties or surplus of green tokens exist. Because the token generation times are deterministic this surplus can be predicted with certainty. Hence substituting red tokens for green tokens does not reduce the net green token utilization because the issuance of these red tokens, at some time, is unavoidable.

The advantage of avoiding token color changes is that this policy decreases the gap creation rate and hence, by Theorem 1, increases the average virtual gap size. Formally, our gap maximization marking policy takes the form $$Z'_n = \begin{cases} 0 & P'_{d_n^-} \geq Y_{d_n^-} \text{ OR } [X'_{d_n}(0) > 0, Z'_{d_n^-} = 0] \text{ OR } X'_{d_n}(1) = 0 \\ 1 & [X'_{d_n}(1) > 0, Z'_{d_n^-} = 1, P'_{d_n^-} < Y_{d_n^-}] \text{ OR } [X'_{d_n}(0) = 0, Z'_{d_n^-} = 0]. \end{cases} \qquad (52)$$

Figure 3:
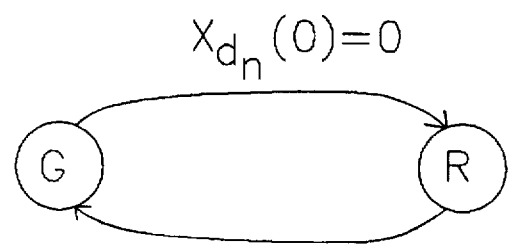
FIG. 3 shows a state transition diagram for the maximum virtual gap policy.

The state transition diagram for this policy is shown in FIG. 3.

As before, let $G_{(t_0, t]}{}^\gamma$ and $R_{(t_0, t]}{}^\gamma$ be queueing processes that count, respectively, the number of green tokens drawn from the green token pool, and the number of red tokens drawn from the red token pool during the interval $(t_0, t)$ under $\gamma \in \Gamma$ and recall (cf. (14)) that for all cell departure times $$G_{(t_0, d_k]}{}^\gamma + R_{(t_0, d_k]}{}^\gamma = G_{(t_0, d_k]}{}^{\gamma'} + R_{(t_0, d_k]}{}^{\gamma'}. \qquad (53)$$

At $\gamma$'s gap departure and gap creation times, $h_n{}^\gamma$ and $g_n{}^\gamma$, the following properties hold.

Lemma 4 When cells are marked in accordance with $\Gamma'$, for all $\gamma \in \Gamma$, (a) at times cells change color from green to red, i.e., at the times $g_n{}^\gamma$, $n \in Z$ $$G_{(t_0, g_n{}^\gamma]}{}^{\gamma'} \geq G_{(t_0, g_n{}^\gamma]}{}^\gamma.$$

(b) at times cells change color from red to green, i.e., at the times $h_n{}^\gamma$, $n \in Z$ $$G_{(t_0, h_n{}^\gamma]}{}^{\gamma'} \leq G_{(t_0, h_n{}^\gamma]}{}^\gamma.$$

Proof:

(a) Under $\gamma'$, departing cells change color from green to red, only if there are no green tokens in the token pool. The proof that leads to the inequality is the same as the proof of Lemma 2-(b).

(b) Under $\gamma'$, departing cells change color from red to green only if either: (i) there are no red tokens in the token pool, or (ii) a surplus of green tokens is expected. The proof that leads to the inequality is the same as the proof of Lemma 2-(a). ∎

The following theorem establishes that $\gamma'$ is the unique marking policy in $\Gamma$ minimizing the gap creation rate for all arrival processes. It follows, by Theorem 1, that $\gamma'$ maximizes the average virtual gap length.

Theorem 3 For all $\gamma \in \Gamma$, and for all realizations of the arrival process $\{a_n\}$, given that $\gamma'$ and $\gamma$ are at the same state at time $t_0$ $$\sum_{n \in 1N} 1_{0 < h_n{}^{\gamma'} \leq 1} \leq \sum_{n \in 1N} 1_{0 < h_n{}^\gamma \leq 1},$$

with strict inequality for some arrival process.

Proof: Because the times at which cells depart are policy independent, it suffices to prove that given that $\gamma$ and $\gamma'$ start from the same initial state $S_0$ and same last marking $Z_0$, $$h_m{}^{\gamma'} \geq h_m{}^\gamma \text{ for all } m \in 1N \qquad (54)$$

with strict inequality for some arrival process. We prove this by induction on m.

For m=1, there are two cases to consider.

(i) Suppose $t_0 \in [g_1{}^\gamma, h_1{}^\gamma)$. Under $\gamma'$, departing cells take red tokens until the red token pool is empty or a surplus of green tokens is expected. Because $\gamma$ and $\gamma'$ are in the same state at $t_0$, and all $\gamma \in \Gamma$ discard the same number of green tokens as the generalized leaky bucket to avoid unnecessarily discarding green tokens, $\gamma$ must switch from red to green no later than $\gamma'$, hence $h_1{}^{\gamma'} \geq h_1{}^\gamma$.

(ii) Suppose $t_0 < g_1{}^\gamma$. Under $\gamma'$ departing cells take green tokens until the green token pool is empty. Because $\gamma$ and $\gamma'$ are in the same state at $t_0$, $\gamma$ can switch from green to red no later than $\gamma'$. Hence $g_1{}^{\gamma'} \geq g_1{}^\gamma$. By Lemma 4-(a) and (53), at time $g_1{}^{\gamma'}$, $G_{(t_0, g_1{}^{\gamma'}]}{}^{\gamma'} \geq G_{(t_0, g_1{}^{\gamma'}]}{}^\gamma$ and $R_{(t_0, g_1{}^{\gamma'}]}{}^{\gamma'} \leq R_{(t_0, g_1{}^{\gamma'}]}{}^\gamma$, i.e., $\gamma'$ has no more green tokens and no fewer red tokens than $\gamma$. This, and the fact that $g_1{}^{\gamma'} \geq g_1{}^\gamma$, ensure that $\gamma'$ will not run out of red tokens, nor accumulate a surplus of green tokens, before $\gamma$. Hence, $h_1{}^{\gamma'} \geq h_1{}^\gamma$.

For m>1 it suffices to show that $$h_{m-1}{}^{\gamma'} \geq h_{m-1}{}^\gamma \qquad (55)$$

implies $$h_m{}^{\gamma'} \geq h_m{}^\gamma. \qquad (56)$$

Observe first that at time $h_{m-1}{}^\gamma$, by Lemma 4-(b) $G_{(t_0, h_{m-1}{}^\gamma]}{}^{\gamma'} \leq G_{(t_0, h_{m-1}{}^\gamma]}{}^\gamma$, i.e., $\gamma'$ has no fewer green tokens than $\gamma$. Because $\gamma'$ uses green tokens until the green token pool is empty, this and (55) lead to $g_m^{\gamma'} \geq g_m^{\gamma}$. (57)

By Lemma 4-(a) and (53), at time $g_m^{\gamma'}$, $G_{(t_0, g_m \gamma']}^{\gamma'} \geq G_{(t_0, g_m \gamma']}^{\gamma}$ and $R_{(t_0, g_m \gamma']}^{\gamma'} \geq R_{(t_0, g_m \gamma']}^{\gamma}$ i.e., $\gamma'$ has no more green tokens, and no fewer red tokens, than $\gamma$. Because $\gamma'$ uses red tokens until the token pool is empty or surplus of green tokens is expected, this and (57) ensure that $\gamma'$ will not run out of red tokens, nor accumulate a surplus of green tokens, before $\gamma$. Hence, $h_m^{\gamma'} \geq h_m^{\gamma}$.

The desired inequality follows by induction.

To see that the inequality is strict for some arrival process, suppose that at times $d_k$, $d_{k+1}$, $d_{k+2}$, and $d_{k+3}$, $\gamma'$ uses green tokens and at times $d_k$ and $d_{k+1}$, and red tokens at times $d_{k+2}$ and $d_{k+3}$, while $\gamma$ alternatively uses green and red tokens. Then at time $d_{k+3}$, $\gamma'$ and $\gamma$ are in the same state, however, $\gamma$ created one more gap than $\gamma'$, and there will be no opportunity to set $h_m^{\gamma'}$ equal to $h_m^{\gamma}$ in the future. ∎

In addition to minimizing or maximizing the average cell gap, the proposed marking policies also reduce the average buffering delay at the intermediate nodes when congestion occurs. When, in the departure stream, we compare our policies' cell markings to those of the generalized leaky bucket scheme. We find that our policies' red cells always precede those of the generalized scheme. Thus when the cell stream encounters a congested node and some of the marked cells must be dropped, the cells dropped under our scheme always have earlier time stamps than those dropped under the generalized scheme.

Recently, Yin, et. al. [15] showed that when cells are dropped at front of the buffers (front dropping) instead of the rear, the average buffering delay, and the overall loss performance for time constrained traffic, are improved. Because the cells marked using our policy are always dropped earlier than those of under the current generalized leaky bucket scheme, the cell buffering delays incurred in the intermediate nodes under our policies are always shorter than those incurred under the generalized leaky bucket scheme. Formally, we have following theorem. The proof is similar to that of Theorem 3 in [10].

Theorem 4 The buffering delays incurred in intermediate nodes under the virtual gap minimization and maximization policies are always shorter than those incurred under the generalized leaky bucket policy.

By changing the token assignment, we can also maximize buffering delays incurred in intermediate nodes. Instead of assigning green tokens first as the standard marking policy does, assigning red tokens first until a surplus of green tokens occurs, incurs the shortest delays. This cell marking method is analogous to the front dropping policy that is known to incur the shortest delays in the cell dropping policies.

Note that in our analysis, we did not assume any specific input distribution. If we know or can measure, the statistics of the inputs, this information can be used to further improve control the marking policy. For example, if we know that the probability of marking of consecutive cells is very low, then the gap minimization policy can be modified to alternatively mark every third cell red, instead of every other cell as we proposed. This would improve the quality of the recovered signal without increasing the average cell gap much, because when burst arrivals occur the spacing between the virtual gaps would be larger.

6. Average Virtual Cell Gap

In this section we derive a closed form expression for the average virtual cell gap, independent of arrival processes and cell marking, seen at departure times, i.e., $E_h^0[L_0^{\gamma}]$.

Under Markov assumptions, we also derive more specific average virtual gap formulas for both the standard marking, and our virtual gap optimization policies.

Lemma 5 The average number of virtual cell gaps is given by $$E_{h\gamma}^0[L_0^{\gamma}] = \frac{1}{P_d^p[Z_0^{\gamma} = 0 | Z_{-1}^{\gamma} = 1)]}. \quad (58)$$

Proof: From the relation derived in Theorem 1 (i.e., $\lambda_z = \lambda_h E_{h\gamma}^0[L_0^{\gamma}]$), the definition of $\lambda_{h\gamma}$ and $\lambda_z$ (i.e., $\lambda_{h\gamma} = \lambda_d E_d^0$ $[Z_0^{\gamma}(1-Z_{-1}^{\gamma})]$ and $\lambda_z = \lambda_d E_d^0[Z_0^{\gamma}]$), we have $$\begin{aligned} E_{h\gamma}^0[L_0^{\gamma}] &= \frac{\lambda_z}{\lambda_{h\gamma}} = \frac{E_d^p[Z_0^{\gamma}]}{E_d^p[Z_0^{\gamma}(1-Z_{-1}^{\gamma})]} \\ &= \frac{1}{1 - \frac{E_d^p[Z_0^{\gamma} Z_{-1}^{\gamma}]}{E_d^p[Z_0^{\gamma}]}} = \frac{1}{1 - \frac{E_d^p[Z_0^{\gamma} Z_{-1}^{\gamma}]}{E_d^p[Z_{-1}^{\gamma}]}} \\ &= \frac{1}{1 - P_d^p[Z_0^{\gamma} = 1 | Z_{-1}^{\gamma} = 1)]} = \frac{1}{P_d^p[Z_0^{\gamma} = 0 | Z_{-1}^{\gamma} = 1)]} \end{aligned} \quad (59)$$

Using this lemma, we can derive policy-specific average virtual gap formulas, under the assumptions that cell arrivals, and green token arrivals, are Poisson processes with rates $\lambda$ and $\lambda_G$, respectively. We also assume that there are infinite number of red tokens, and that the cell transmission time is very small compared to cell arrival or green token generation periods.

1. Standard Marking: When the standard marking policy is applied, from the underlying Markov chain, we find that in steady state the probability that a departing cell takes a green token given that the previous departure took a red token is $\lambda_G/(\lambda+\lambda_G)$. Thus, $P_d^0[Z_0^{\gamma}=0 | Z_{-1}^{\gamma}=1)]$ is given by $$P_d^p[Z_0^{\gamma} = 0 | Z_{-1}^{\gamma} = 1)] = \frac{\lambda_G}{\lambda + \lambda_G}. \quad (60)$$

Hence, the average cell gap is $$E_v^0[L_0] = \frac{1}{P_d^p[Z_0^{\gamma} = 0 | Z_{-1}^{\gamma} = 1)]} = \frac{\lambda + \lambda_G}{\lambda_G} = 1 + \rho, \quad (61)$$

where $\rho = \lambda/\lambda_G$ is the fraction of the cells that take green tokens.

Figure 4:
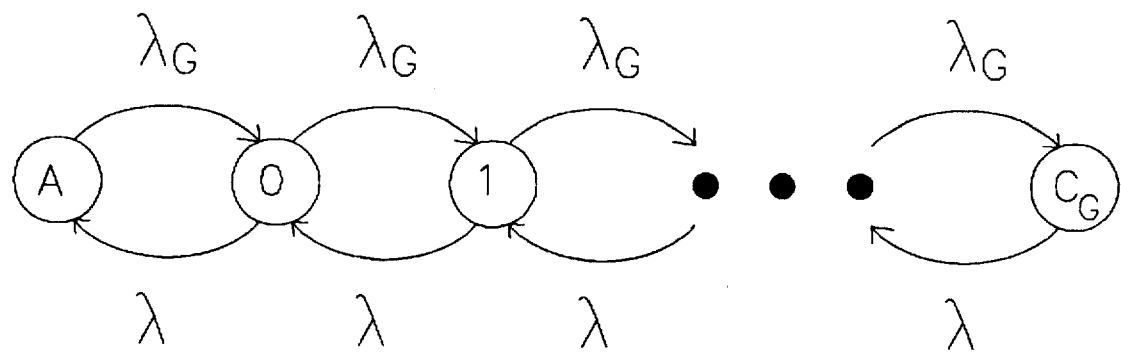
FIG. 4 shows Markov chain for the minimum marking policy with Markov.

2. Minimum Gap Marking: When our gap minimization policy is applied, the number of green tokens in the token pool satisfies the birth-death Markov chain in FIG. 4 with birth rate $\lambda_G$ and death rate $\lambda$ or smaller. Thus, in steady state, the probability that a departing cell takes a green token given that the previous cell took a red token is:

$$\begin{aligned} P_d^p[Z_0^{\gamma} = 0 | Z_{-1}^{\gamma} = 1)] &= 1 - P[MC \text{ state is } A] \quad (62) \\ &> 1 - \pi_A \\ &= 1 - \rho^{C_G+1} \left( \frac{1-\rho}{1-\rho^{C_G+2}} \right), \end{aligned}$$

where $\pi_A$ denotes the steady state probability that Markov chain is in state A at cell departure times for death rate $\lambda$. Therefore, the average virtual cell gap can be upper bounded as follows:

$$E_v^0[L_0] = \frac{1}{E_o^0[Z_0]} < \frac{1}{1 - \rho^{C_G+1} \left( \frac{1-\rho}{1-\rho^{C_G+2}} \right)} = \frac{1 - \rho^{C_G+2}}{1 - \rho^{C_G+1}}. \quad (63)$$

3. Maximum Gap Making: In steady state, the probability that a departing cell takes a green token given that the previous departure took a red token, is less than $\lambda_G/(\lambda+\lambda_G)$ because, under the maximum virtual gap policy, once a red token is assigned, departing cells take red tokens until a surplus of green tokens is detected. Thus, $P_d^0[Z_0^\gamma=0|Z_{-1}^\gamma=1)]$ is upper bounded by $$P_d^0[Z_0^\gamma = 0|Z_1^\gamma = 1)] < \frac{\lambda_G}{\lambda + \lambda_G} \quad (64)$$

Hence, the virtual cell gap can be lower bounded as follows:

$$E_v^0[L_0] = \frac{1}{P_d^0[Z_0^\gamma = 0|Z_1^\gamma = 1)]} > \frac{\lambda + \lambda_G}{\lambda_G} = 1 + \rho. \quad (65)$$

To better appreciate the difference between the three marking policies, it is helpful to compute the average cell gap using realistic numbers.. Computing the average virtual cell gap for the standard marking, virtual cell gap minimization, and virtual cell gap maximization policies for $C_G=10$ and $\rho=0.9$ under Markov assumptions, we find that the average gap size is 1.900 for the standard marking policy, and 1.046 for virtual cell gap minimization, and greater than 1.900 for virtual cell gap maximization. When $\rho=2$, the average virtual gap size is 3.000 for the standard policy, less than 2.000 for virtual cell gap minimization, and greater than 3.000 for virtual cell gap maximization. Although the average virtual gap sizes under non-Markov assumptions will be somewhat different, this example still illustrates the relative effectiveness of the proposed policies. Note that the virtual cell gap size can not be made less than one.

7. Experimental Evaluations

In this section, we present the results of simulation experiments designed to illustrate several properties of the optimal cell marking policies. In particular, we examine how the policies affect the average virtual cell gap, and we compare our simulations with those obtained using the analytical approximations derived in Section 6.

Our simulations consider two types of traffic. ON-OFF traffic is used to model traffic that is typical of voice calls, while Poisson traffic is used to model data transmissions. More specifically, each voice call is modeled as an on-off source with constant arrivals, an exponentially distributed active period $\Sigma_{on}$, during which cells are generated at constant rate $c_1/D$ ($c_1=64$ Kbits/s, D=48 Bytes/Cell) and an exponentially distributed silent period $\Sigma_{off}$, during which no cells are generated. $\Sigma_{on}$ and $\Sigma_{off}$ are assumed to be statistically independent, with means of, respectively, 352 ms and 650 ms. The average rate of these voice calls is $$E[\lambda_{voice}] = \frac{E[\Sigma_{on}]}{E[\Sigma_{on}] + E[\Sigma_{off}]} * c_2 = 22.5 \text{ Kb/s}.$$

Since each cell can accommodate 48 bytes of data, it contains 6 ms of voice information. Thus, in the voice model, we generate one cell every 6 ms during the ON periods. Hence, on average, roughly 59 cells are generated during each ON period. The data traffic is modeled as a Poisson process with average cell rate $$E[\lambda_{data}] = c \text{ cells/s}.$$

In the simulations, we fix the input and the red token generation rates to 1.0 and vary the green token rate and cell transmission time for cell buffer and green token pool sizes of 10. Note that the cell transmission time includes a fixed spacer interval. We use the SIMAN simulation language [12] to perform the simulations. To improve on simulation accuracy, we repeated each simulation 10 times, using 15.000 cells each time.

Figure 5A:
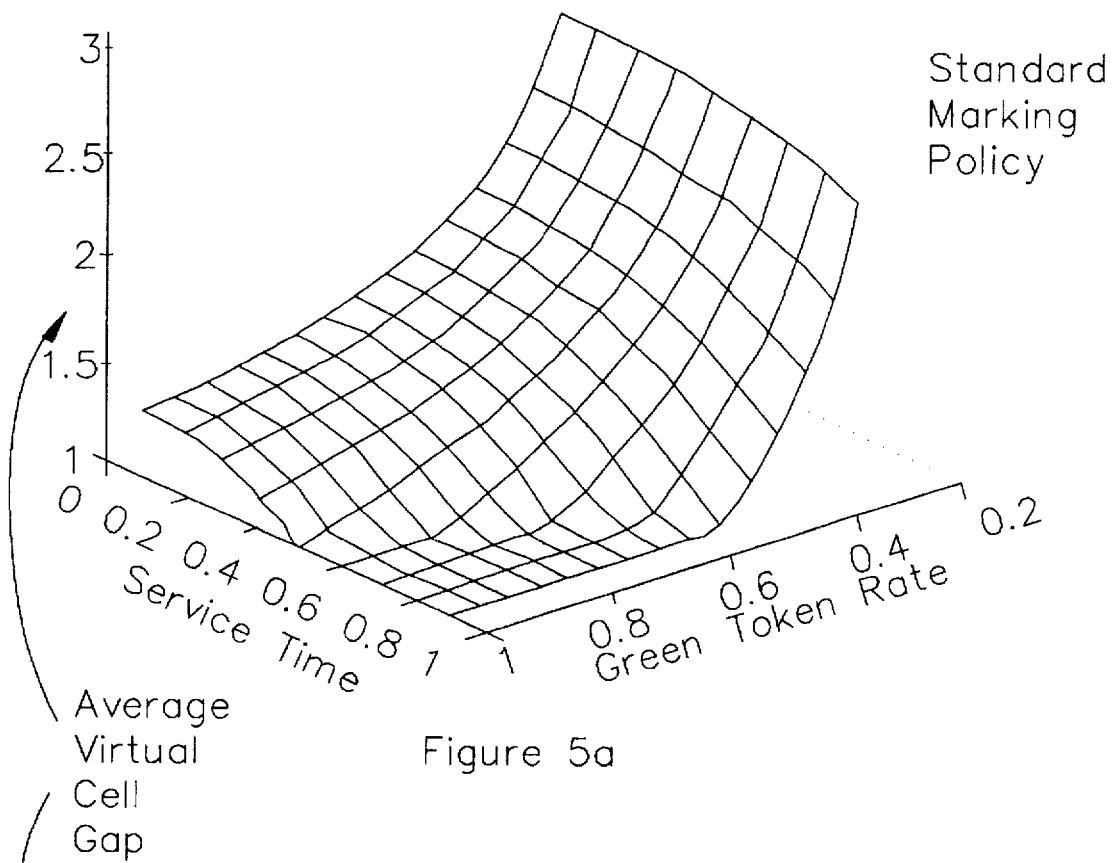
FIG. 5a shows the average virtual cell gap produced by a standard marking policy and FIG. 5b shows the average virtual cell gap policy with Poisson inputs (cell buffer size=10, green token pool size=10, and red token pool size is infinite).
Figure 5B:
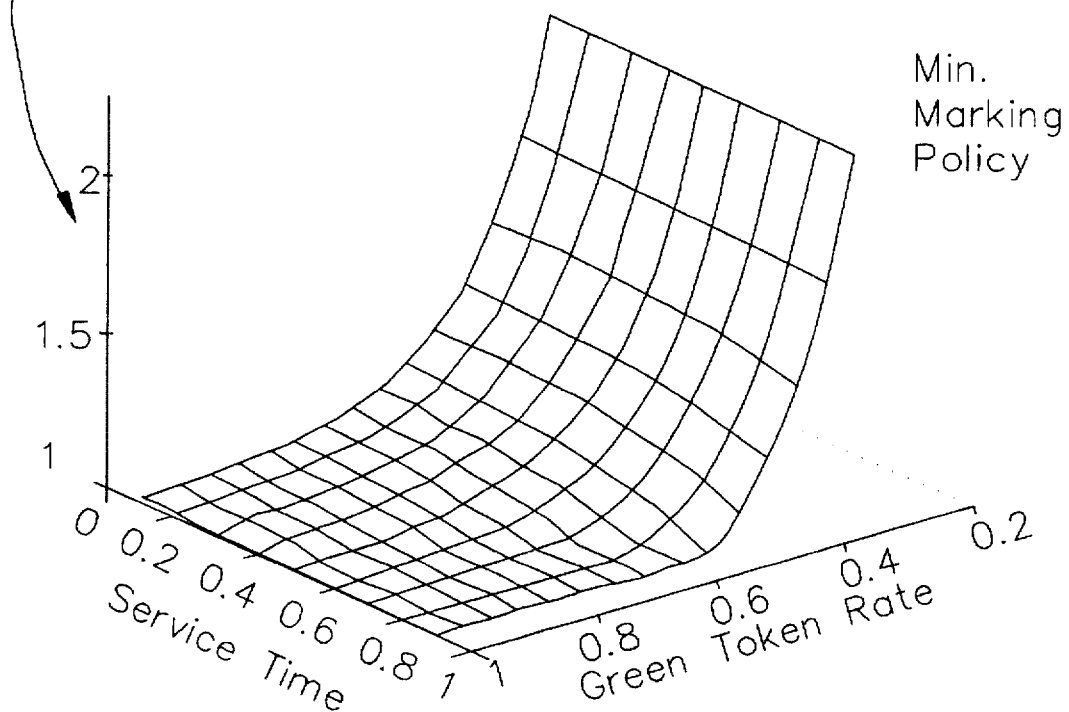
Figure 6A:
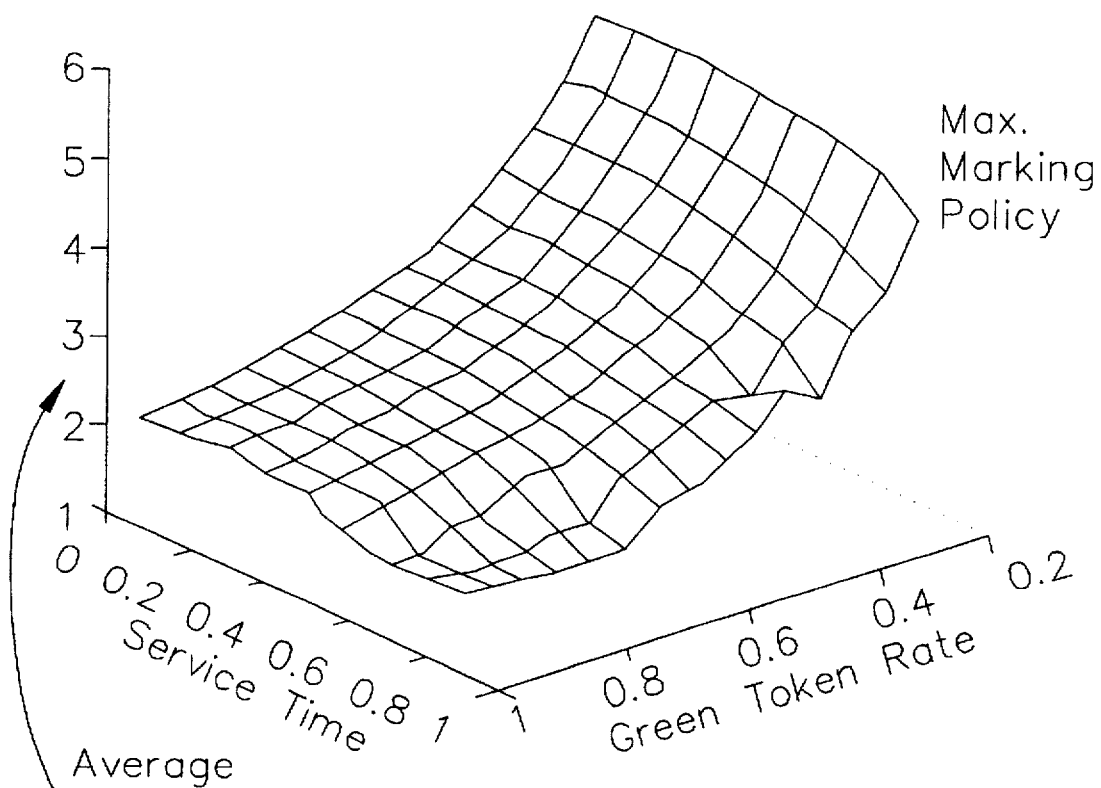
FIG. 6a shows the average virtual cell gap produced by the maximum virtual cell gap policy.
Figure 6B:
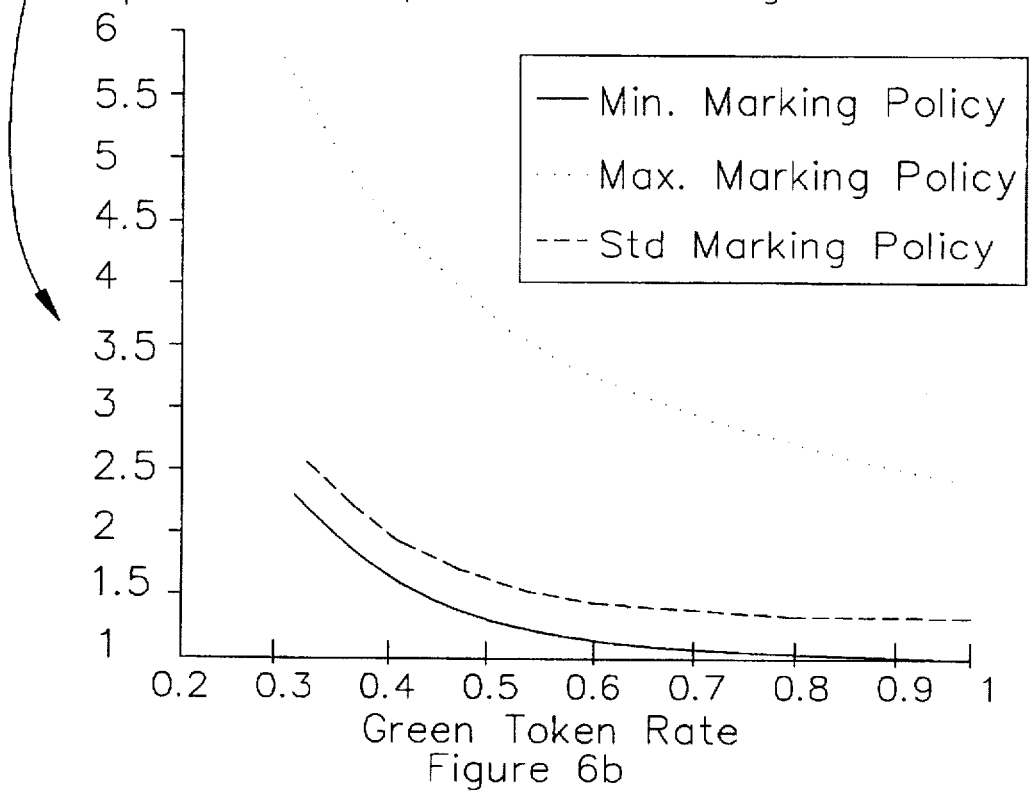
FIG. 6b shows comparison of the average virtual cell gap when the cell transmission time is 0.1, with Poisson inputs (cell buffer size=10, green token pool size=10, and red token pool size is infinite).

FIGS. 5 and 6-(a) plot, respectively, the average virtual cell gap for Poisson inputs versus the green token generation rate and the cell transmission time for an arrival rate of 1.0, under, respectively, the standard, minimum, and maximum virtual cell gap marking policies. As predicted, the average virtual gap sizes of the standard marking policies are much larger than that of the minimum cell gap marking policy and much smaller than that of the maximum cell gap marking policy. The average gap size of the standard marking policy is slightly smaller than $1+\rho(\rho=\lambda/\lambda_G=1/\lambda_G)$, the analytical result obtained under the Markov assumption, because green token generation is more regular in the deterministic green token generation case. The average gap size under the minimum virtual cell gap marking policy is also somewhat less than the predicted size $(1-\rho^{C_G+2})/(1-\rho^{C_G+1})$. As expected, in the case of the maximum virtual cell gap marking policy, the average cell gap size is highly dependent on the green token rate.

Observe that as the cell transmission time increases, the average virtual cell gap decreases. This is because, under the standard marking policy, in which cells draw green tokens whenever they are available, as the cell transmission time becomes larger, the cell buffering time increases. As a result, more green tokens can be made available to departing cells. Under the minimum or maximum virtual gap policies, as the cell transmission time increases, the expected green token shortage decreases. Hence, the average virtual cell gap decreases. These results illustrate that the analytical results mirror the simulation fairly well, and that the optimal policies become more effective as the spacer interval decreases.

FIG. 6-(b) plots the average virtual cell gap of the three cell marking policies for Poisson inputs versus the green token generation rate when the ratio of the cell transmission time to the cell generation period is 0.1. From the figure it is clear that in Poisson input case, the minimum and the maximum virtual gap policies are superior to the standard marking policy for all utilization levels (input and green token rate).

Figure 7A:
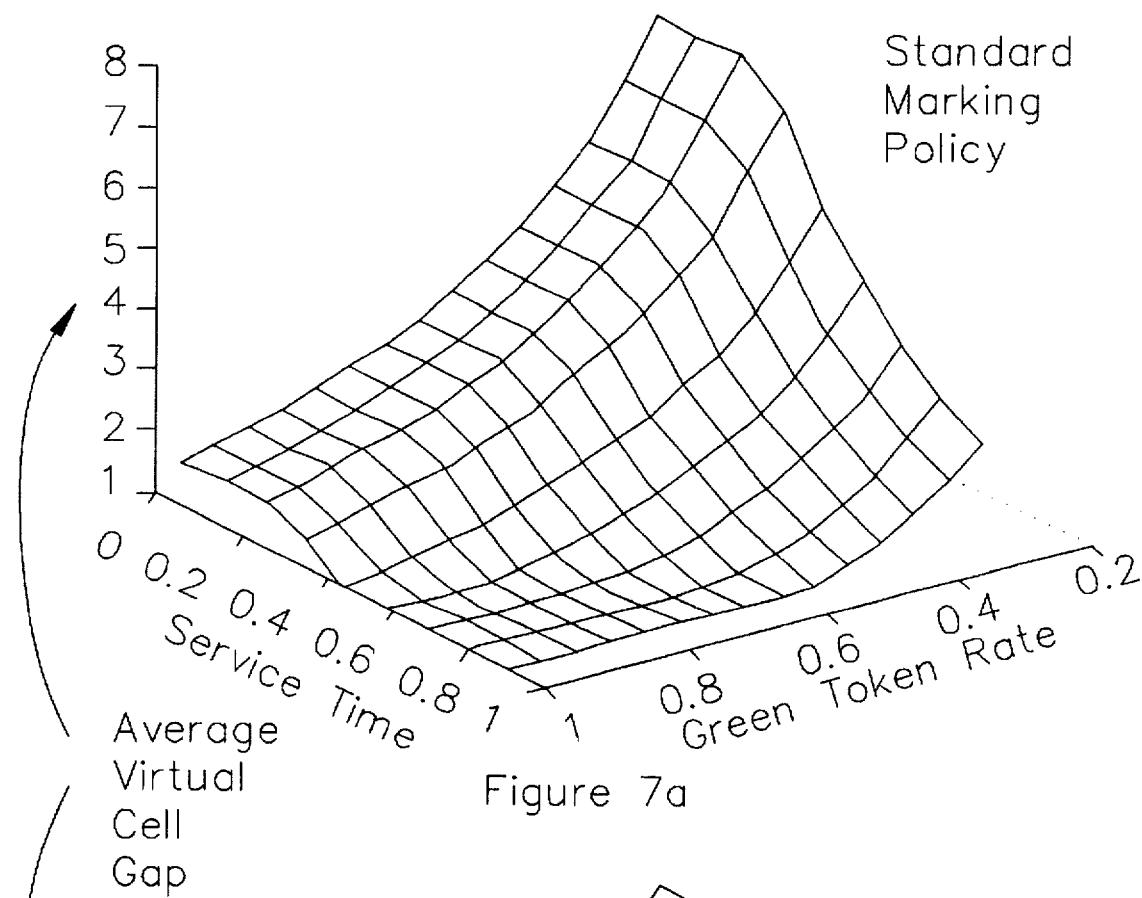
FIG. 7a shows average virtual cell gap produced by the standard marking policy.
Figure 7B:
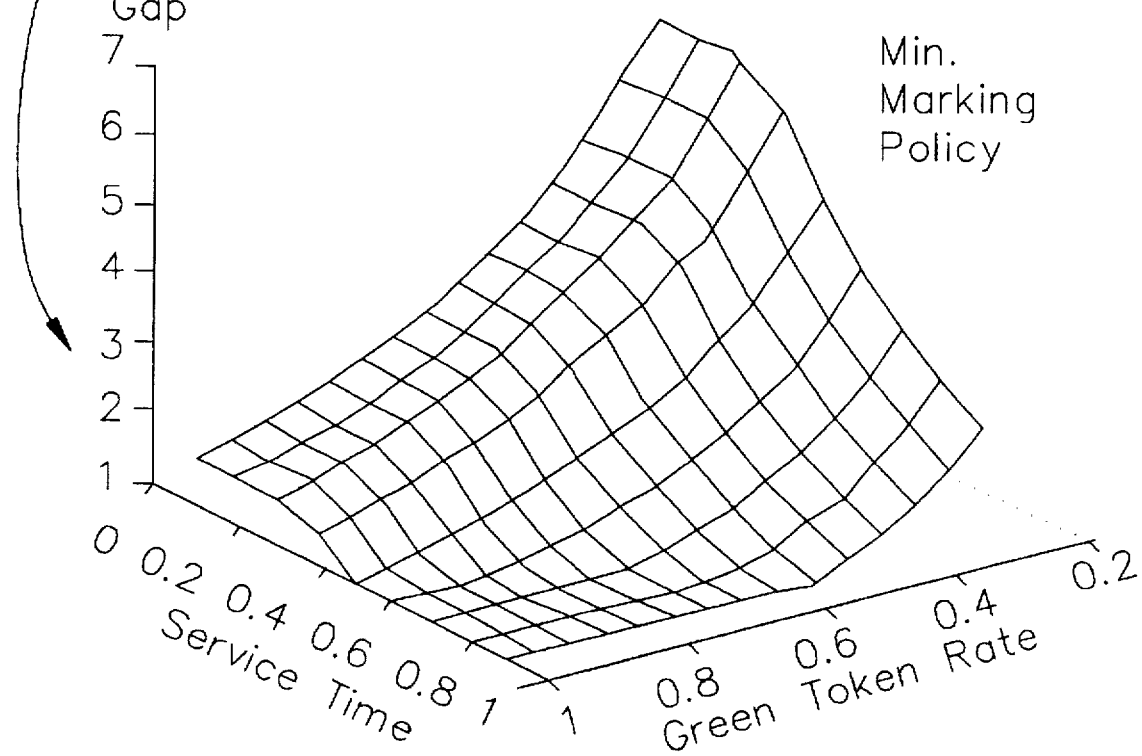
FIG. 7b shows the minimum virtual cell gap policy with ON-OFF inputs (cell buffer size=10, green token pool size=10, and red token pool size is infinite).
Figure 8A:
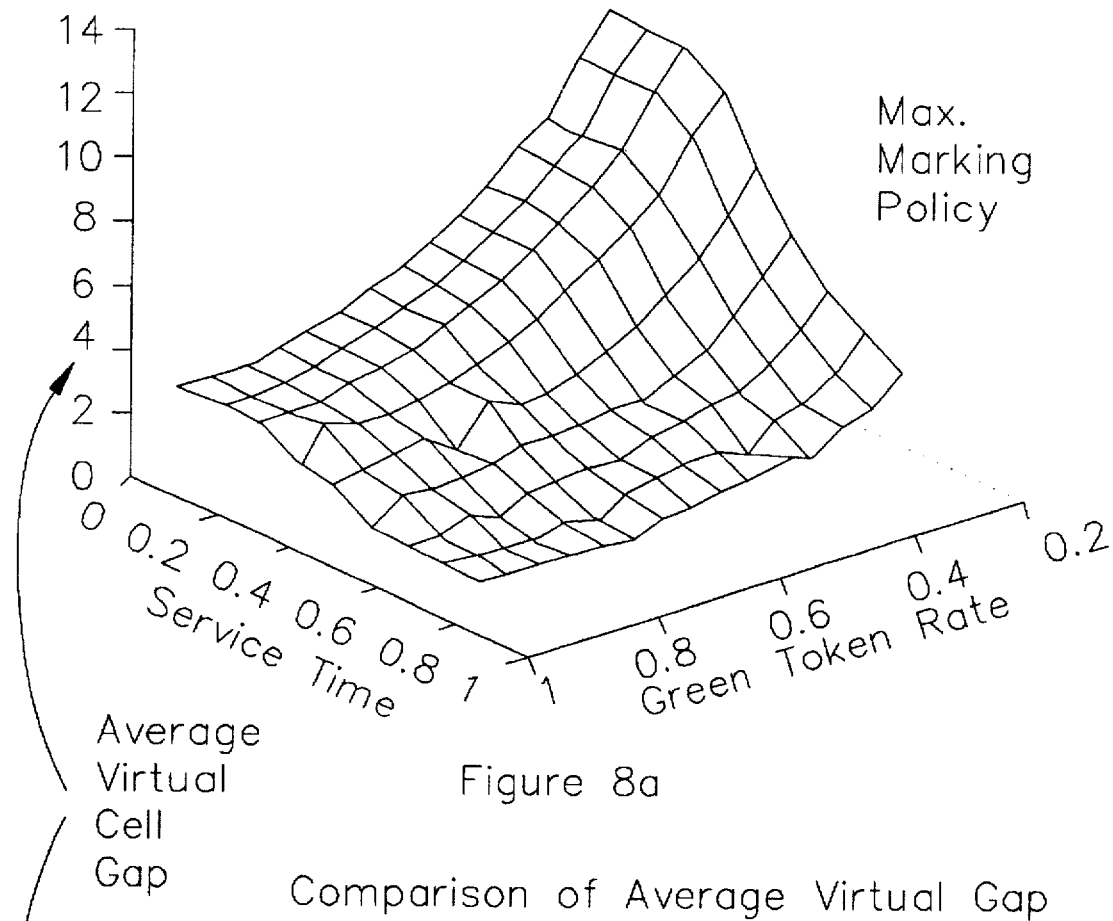
FIG. 8a shows average virtual cell gap produced by the maximum virtual cell gap.
Figure 8B:
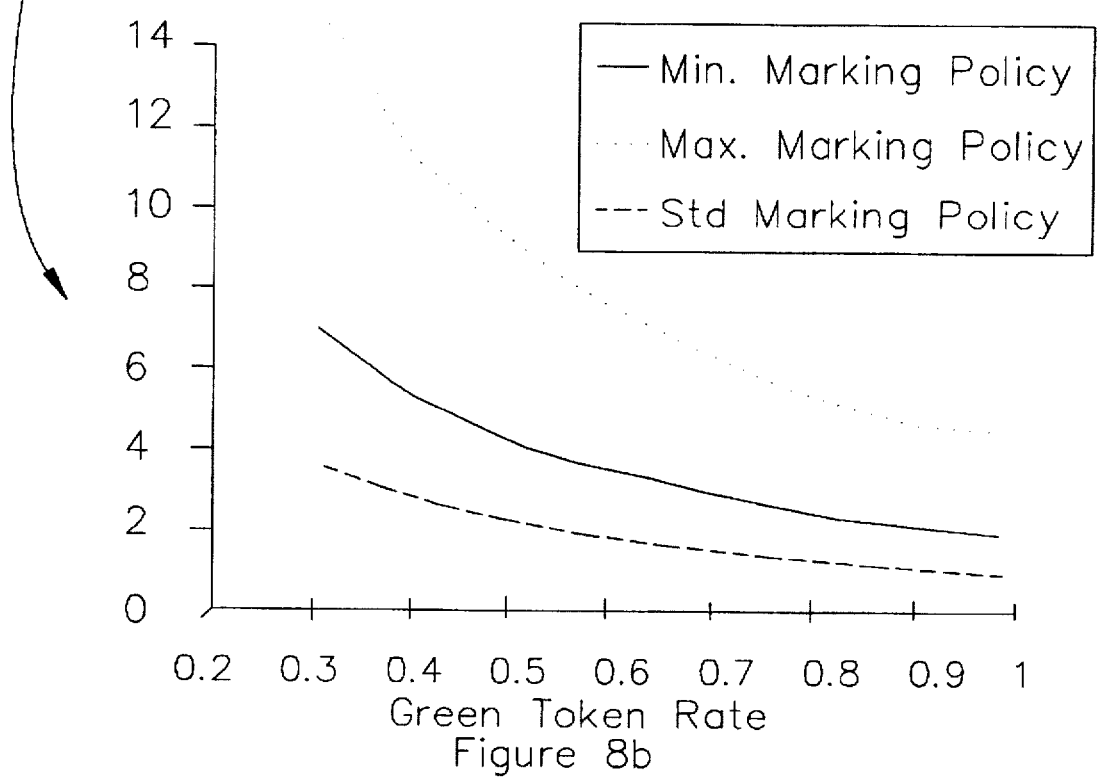
FIG. 8b shows a comparison of the average virtual cell gap when the cell transmission time is 0.1, with ON-OFF inputs (cell buffer size=10, green token pool size=10, and red token pool size is infinite).

FIGS. 7 and 8-(a) plot, respectively, the average virtual cell gap for ON-OFF inputs versus the green token generation rate and the cell transmission time for an arrival rate of 1.0, under, respectively, the standard, minimum, and maximum virtual cell gap marking policies. The simulations exhibit the same general trends as the ones with Poisson inputs.

FIG. 8-(b) plots the average virtual cell gap of the three cell marking policies versus green token generation rate when the cell transmission time is 0.1. For ON-OFF inputs, the gap performance of the minimum and the maximum cell gap policies remains superior to that of the standard marking policy. Because ON-OFF inputs are more bursty than Poisson inputs, for the same input, green token generation rates, and cell transmission time, the average virtual cell gap of each policy is larger than that for Poisson inputs. However, because our cell marking policies are optimal sample-path-by-sample-path, as shown in FIG. 8 (b), the average virtual gap size of the minimum virtual gap policy is always smaller, and that of the maximum virtual gap policy is always larger, than that of standard marking policy.

Figure 9:
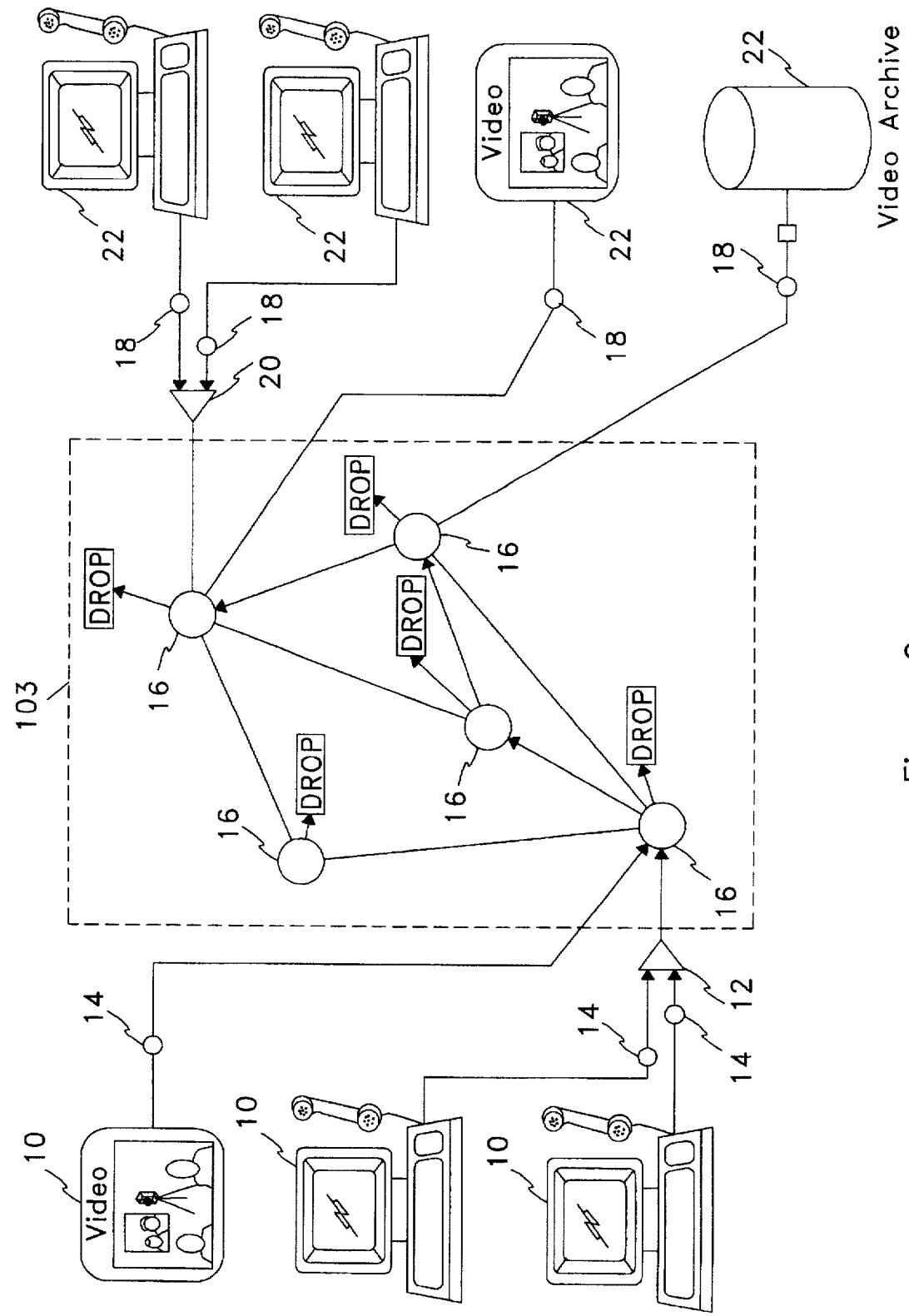
FIG. 9 shows a block diagram of a typical packet switched network connected to multiple information sources, a multiplexer, a demultiplexer, and multiple information destinations in which the invention can be implemented.

FIG. 9 shows a block diagram of a typical packet switched network 903 connected to multiple information sources 10, a multiplexer 12, a demultiplexer 20, and multiple information destinations 22. Information sources can be any digital system that can transmit and/or receive digital information such as a computer terminal, file server, picture phone, etc. Since many information sources are bidirectional, they can be treated as both an information source 10, and an information destination 22. The packet switched system includes switched nodes 16 for routing packets.

The leaky bucket admission mechanisms are located at points where source traffic enters the network 14. To avoid overloading the network 103, source rate and burst length constraints are negotiated when a source's virtual circuit is set up. The admission mechanisms 14 mark source packets that violate these negotiated constraints for preferential discarding should the packets later encounter congestion. In ATM networks, violation marking is accomplished by setting the Cell Loss Priority (CLP) bit to one. Should any of these marked cells encounter congestion in any network buffer, they are the first to be dropped.

Figure 10:
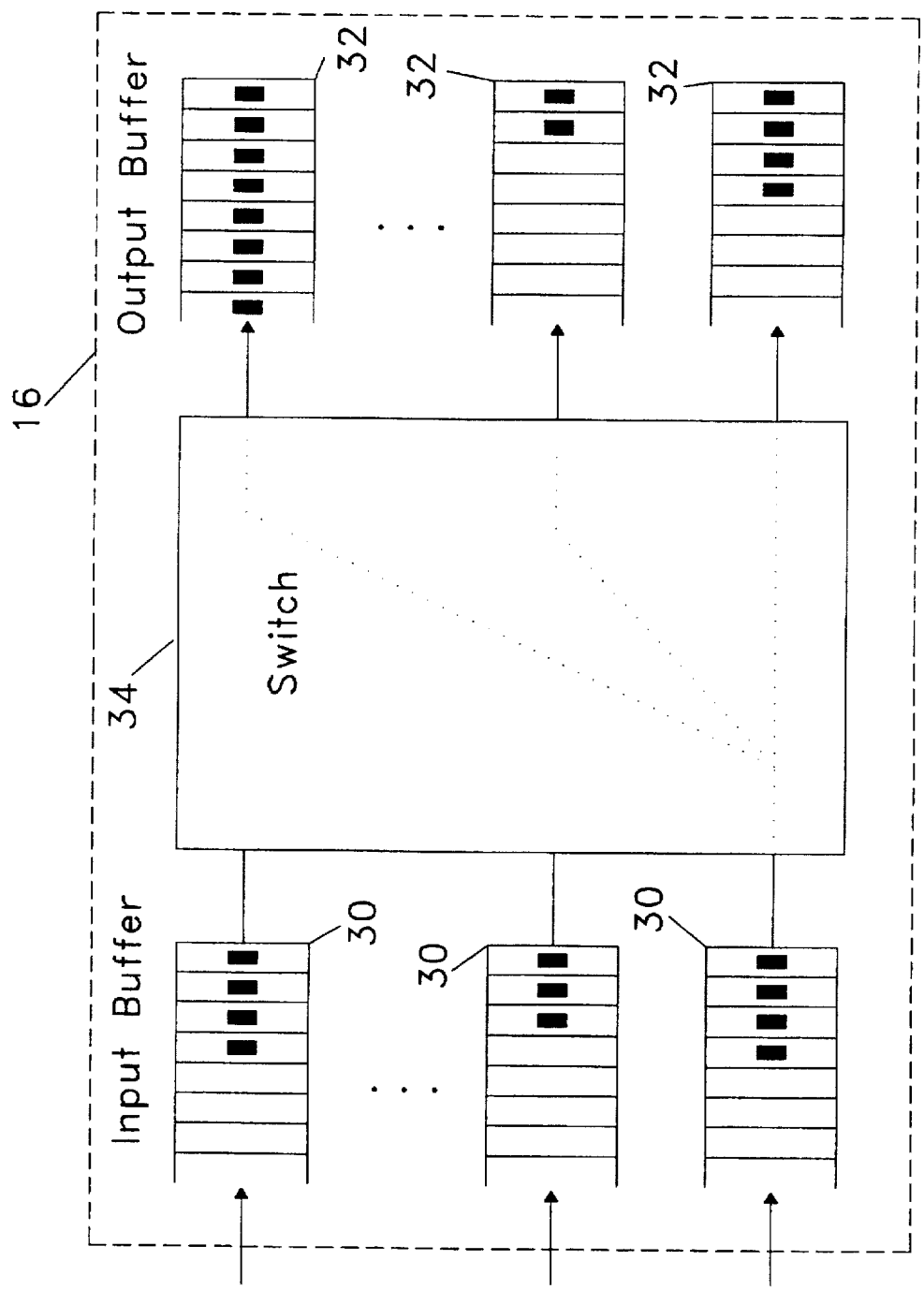
FIG. 10 shows a block diagram of a typical switching node having input buffers, output buffers, and a switch.

FIG. 10 shows a block diagram of a typical switching node 16 having input buffers 30, output buffers 32, and a switch 34. The input buffers 30 store incoming packets that are waiting for routing. The switch 34 routes packets. The output buffers 32 store packets that have been routed, but are waiting to be sent. There is a limit to the number of packets that a typical switching node can handle at one time. If too many packets arrive at the same time, congestion can occur and the associated input buffer 30 or output buffer 32 may become full. In this case, packets whose mark (CLP bit) indicates that they violated negotiated admission rates or burst length constraints are dropped first.

Regardless of whether the original information is real-time data (e.g., voice and video) for which a minimum average packet gap is preferred, or traffic that uses retransmission to correct errors (e.g., certain types of computer data) for which a maximum average packet gap is preferred, to improve session performance, it is desirable to employ a packet marking policy that controls the average packet gaps created when marked packets are dropped. No existing packet marking policy is designed to control the average packet gap created when marked packets are dropped by standard CLP-based dropping mechanisms. However, as proved above, variations of these marking policies are capable of optimally controlling the average packet gaps created when marked packets are dropped by standard CLP-based dropping mechanisms.

Figure 11:
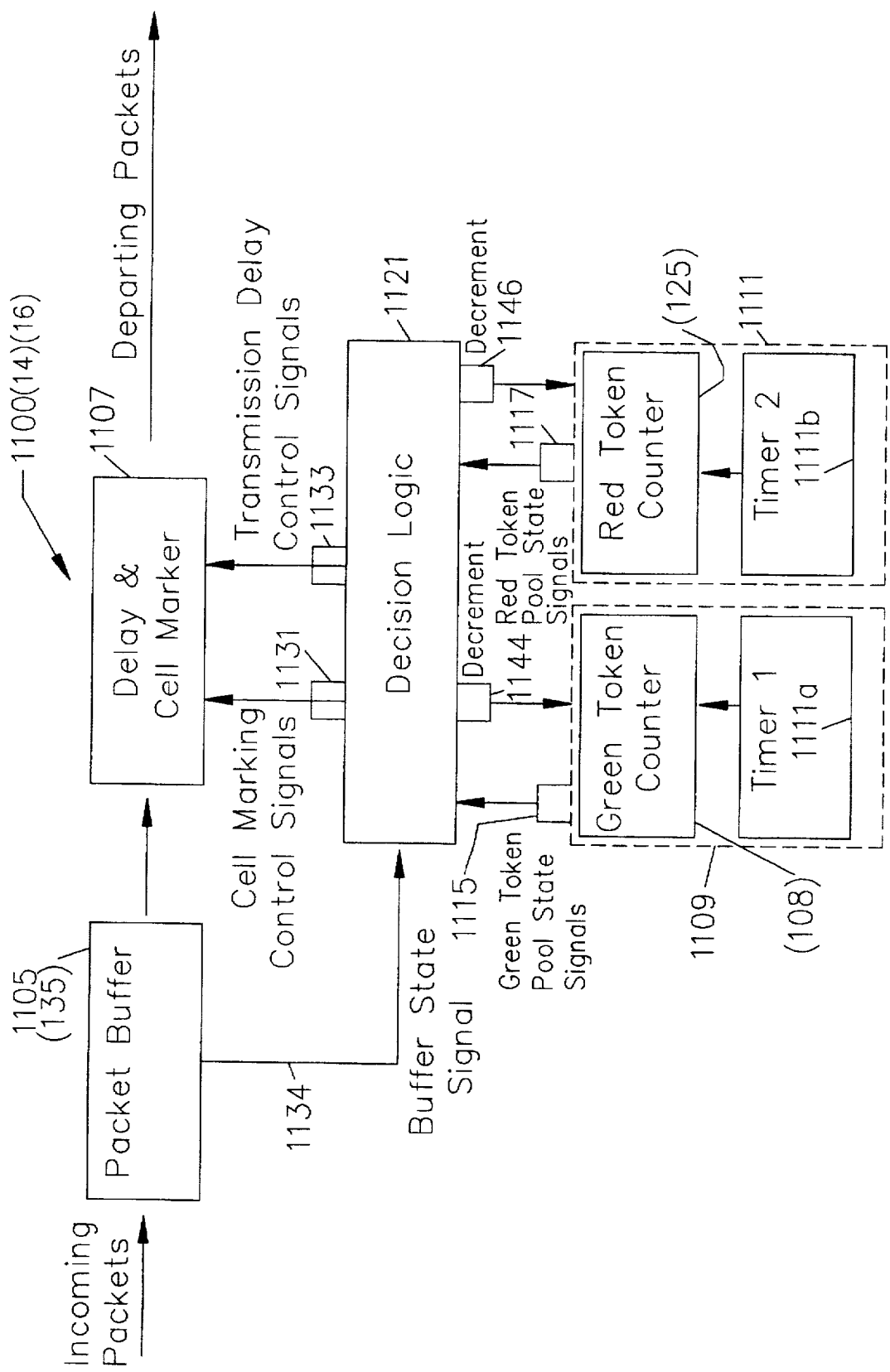
FIG. 11 shows schematically, one way of integrating a circuit according to one embodiment of the invention with a leaky bucket system of FIG. 1.

As discussed above, FIG. 1 depicts a typical leaky bucket admission mechanism (which could be located at any network entry point as previously discussed). Referring once again to FIG. 1, the admission mechanism consists of a packet buffer 135, a cell spaced 131, green 108, and red 125 token pools, and a token generator 111. The system of FIG. 1 can be modified to implement the above discussed method according to one embodiment of the invention. (FIG. 11 shows a circuit implementing the functions discussed below.)

The desired admission mechanism consists of a packet buffer 135 and token pools 108-and 125, controls the marking assigned to cells departing from the cell spacer 105 so as to either minimize, or maximize the average number of consecutive cells that are dropped should the cells marked for preferential dropping encounter congestion.

The buffer 135 stores incoming packets, releases outgoing packets, produces necessary buffer state signals to indicate the current buffer state, and receives release signals from the cell spacer indicating when admission and packet marking are permitted. When the buffer overflows, arriving packets are dropped. The buffer storage element 135 is well known in the art and may be built from a conventional memory with an embedded system of pointers. Such memory devices are currently used in all packet switched systems and are available from a large number of sources as discussed in "ATM Silicon: Ready for Takeoff," Electronic Design, Apr. 4, 1994, pp. 51–65, the contents of which are incorporated herein by reference.

The cell spacer 105 delays admitted packets to ensure a minimal spacing, marks the packets (e.g., sets the CLP bit) when negotiated cell rates or burst constraint violations are detected, and signals the buffer when admission and packet marking are permitted. The token pools 108 and 125 are used to determine when violations occur and the token generators 111 are used to periodically supply tokens to the token pools. When the token pools overflow, the arriving tokens are discarded. The spacer delay, the token pool capacities, and the token supply rates are typically negotiated when a connection is set up and may be changed during the connection as necessary. The memory devices used to implement the spacer are conventional memory devices well known in the art.

FIG. 11 shows a system 1100 according to one embodiment of the invention that integrates the above methods for controlling packet marking (decision marking) with the standard leaky bucket admission system and can be located at the network input point 14 (and/or partially or completely at node 16). In that figure, the system 1100 receives state signals from a packet buffer 1105, the green token pool unit 1109, and the red token pool unit 1111, with timer 1 1111a and timer 2 1111b and generates signals at outputs 1115 and 1117 for controlling packet marking, cell delay, and token pool decrementation. Since most of the circuit's state transitions involve either incrementing or decrementing a state counter, decision logic 1121 implementing the marking policy can easily be realized in a state machine by, e.g., using Programmable Array Logic (PAL), a Gate Array, a Standard Cell or a Field Programmable Gate Array (FPGA), or using software in a microprocessor. It could also be incorporated into software controlling the leaky bucket admission system's buffer and spacer. Delay & cell marker 1107 corresponds to 105' of FIG. 1 and marks signals in accordance with cell marking control signals from output 1131 and transmission delay control signals output from 1133. Decision logic unit 1121 also outputs decrement control signals to green token pool 1109 and red token pool 1146 at outputs 1144 and 1146, respectively.

Figure 12:
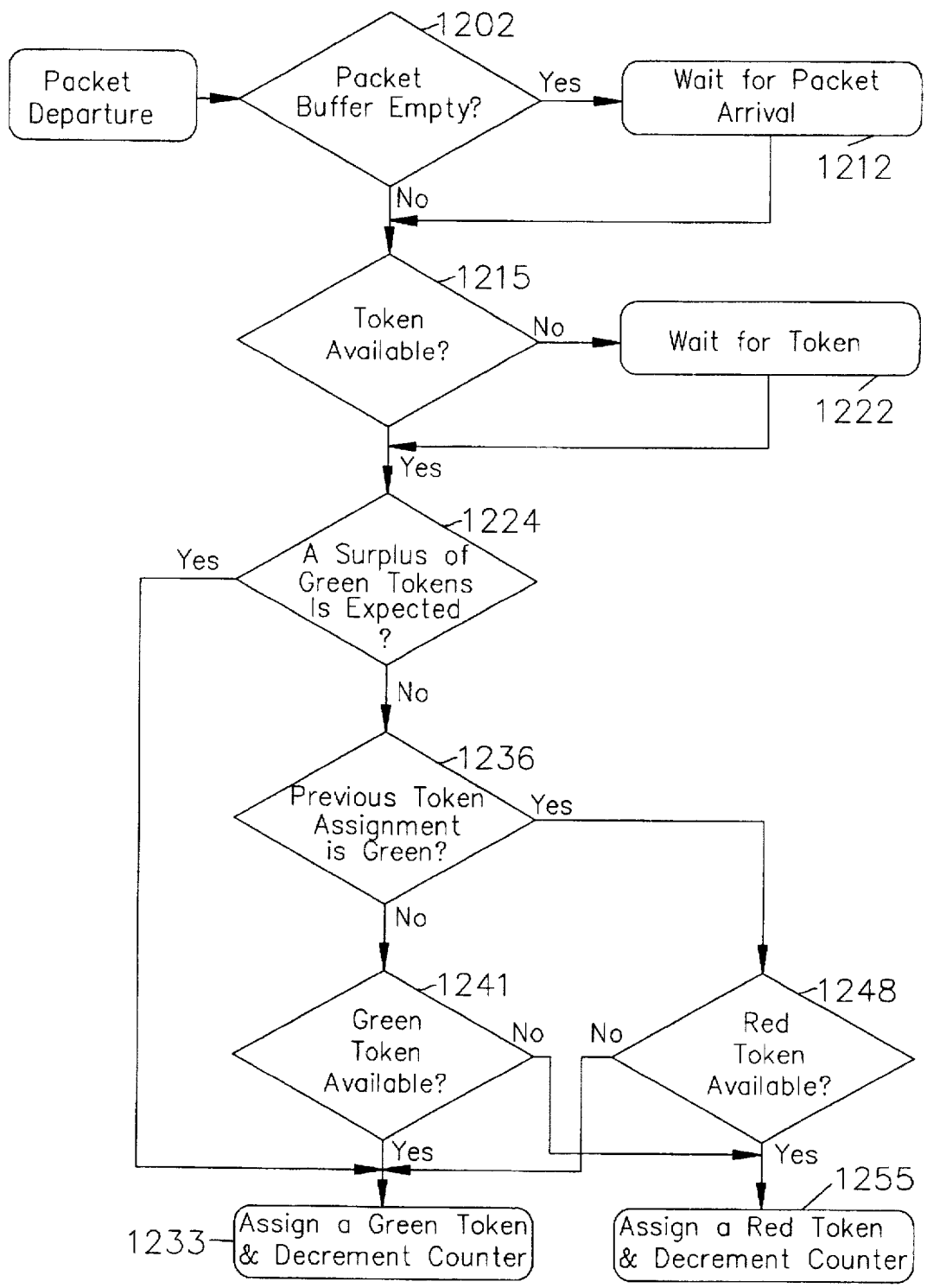
FIG. 12 shows the decision logic underlying the minimum gap marking rule.
Figure 13:
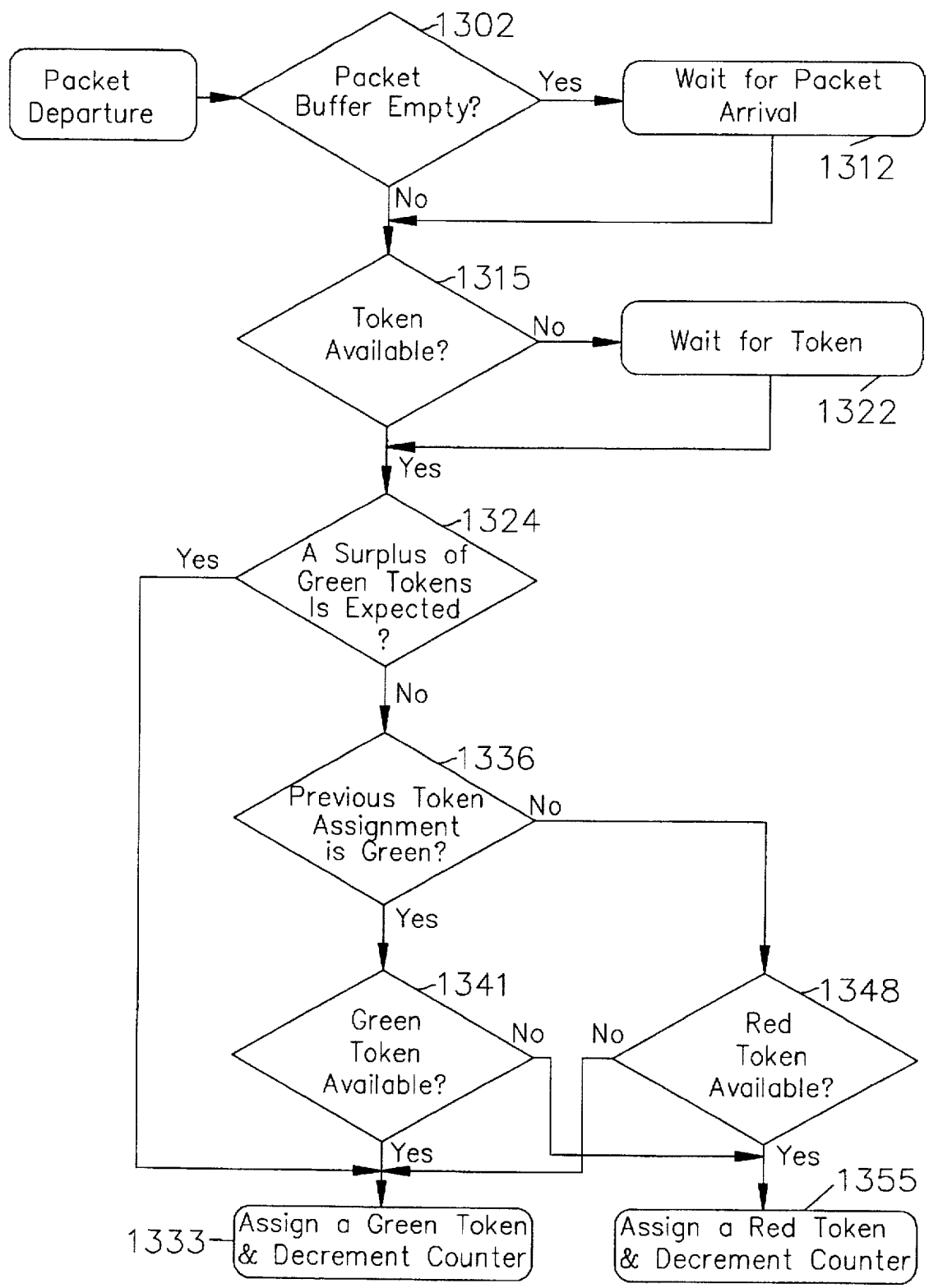
FIG. 13 shows the decision logic underlying the maximum gap marking rule.

The state transition logic invoked by system 1100 depends on the particular traffic to be admitted. When real-time traffic is present (e.g., interactive voice or video), the minimum average gap marking rule logic depicted in FIG. 12 is used. When traffic that uses retransmission to correct errors is present (e.g., certain file and computer data transfers), the maximum average gap marking rule logic depicted in FIG. 13 is used.

Under the minimum gap marking rule (FIG. 12), when a packet departs from the cell spacer 1107, the next packet in the buffer 1105 is admitted to the cell spacer 1107 and marked green (e.g., the CLP bit set to 0) when a surplus of green tokens is expected and marked the opposite color of the previous packet's token unless no tokes of that color are available in which case a token of the same color is assigned.

Under the maximum gap marking rule (FIG. 13), when a packet departs from the cell spacer 1107, the next packet in the buffer 1105 is admitted to the cell spacer 1107 and marked green (e.g., the CLP bit is set to 0) when a surplus of green tokens is expected and marked the same color as the previous packet's token unless no tokens of that color are available in which case a token of the opposite color is assigned. In both instances, a surplus of green tokens is expected when, as previously discussed in the section "Virtural gap minimization" of this specification, the following condition holds.

$$\left(\begin{array}{c}\text{\# buffered}\\ \text{packets}\end{array}\right)\left(\begin{array}{c}\text{cell spacer}\\ \text{interval}\end{array}\right)\left(\begin{array}{c}\text{green token}\\ \text{generation rate}\end{array}\right)+$$

$$\left(\begin{array}{c}\text{\# in green}\\ \text{token pool}\end{array}\right)\geq\left(\begin{array}{c}\text{\# buffered}\\ \text{packets}\end{array}\right)?$$

In words, a surplus of green tokens is expected when the number of buffered packets, multiplied by the cell spacer interval, and then by the green token generation rate and then that value is then added to the number of tokens in the green token pool to yield a total which is greater than or equal to the number of buffered packets. Once the marking decision has been made, the decision logic delays release of the marked packet (using the transmission delay control signal) until the current minimum cell spacing interval (negotiated at call setup and modified as necessary) has elapsed.

Referring to FIG. 12 in more detail, upon occurrence of a packet departure, a buffer state signal on line 1134 indicates to decision logic unit 1121 whether or not buffer 1105 is empty (step 1202). If packet buffer 1105 is empty, decision logic unit 1121 waits for a packet to arrive to buffer 1105 at step 1212. If packet buffer is not empty, decision logic unit 1121 determines whether a token is available (step 1215) from green token pool 1109 by receiving green token state signals from output 1115. If no green tokens are available, unit 1121 waits (step 1222) for a green token to become available from token pool 1109 and then proceeds to step 1224. If a green token is available at step 1215, unit 1121 determines whether a surplus of green tokens are expected at step 1224. As previously explained, there is a surplus of green tokens when the above discussed condition holds. If unit 1121 determines that a surplus of green tokens is expected, it causes delay and cell marker 1107 to mark the cell it is holding i.e., it assigns a green token to the cell and green token counter 1109 is decremented at step 1233. If a surplus of green tokens is not expected, i.e., the above condition does not hold, unit 1121 determines whether the previous token assignment was a green token at step 1236. If unit 1121 determines that the previous assignment was not a green token at step 1236, it determines whether a green token is available at step 1241, and if so, step 1233 is performed. If unit 1121 determines that the previous token assignment was a green token at step 1236, it determines whether any red tokens are available (step 1248) in red token pool 1111. If red tokens are available in red token pool 1111, the cell in delay and cell marker 1107 is assigned a red token at step 1255. If no red tokens are available, step 1233 is repeated.

FIG. 13 shows steps performed by system 1100 to maximize average cell gap. Steps 1302, 1312, 1315, 1322, and 1324 correspond to steps 1202, 1212, 1215, 1222, and 1224, respectively in FIG. 12, and consequently will not be repeated here. Unit 1121 determines whether a surplus of green tokens are expected at step 1324. As previously explained, there is a surplus of green tokens when the above discussed condition holds. If unit 1121 determines that a surplus of green tokens is expected, it causes delay and cell marker 1107 to mark the cell it is holding i.e., it assigns a green token to the cell and green token counter 1109 is decremented at step 1333. If a surplus of green tokens is not expected, i.e., the above condition does not hold, unit 1121 determines whether the previous token assignment was a green token at step 1336. If unit 1121 determines that the previous assignment was a green token at step 1336, it determines whether a green token is available at step 1341, and if so, step 1333 is performed. If unit 1121 determines that the previous token assignment was not a green token at step 1236, it determines whether any red tokens are available (step 1348) in red token pool 1111. If red tokens are available in red token pool 1111, the cell in delay and cell marker 1107 is assigned a red token at step 1355. If no red tokens are available, step 1333 is repeated.

Obviously numerous and additional modifications and variations of the present invention are possible in light of the above teachings. It is therefore to be understood that, within the scope of the appended claims, the invention may be practiced otherwise than as specifically disclosed and claimed herein.

What is claimed is:

1. A method for controlling the average cell gap of traffic transported in asynchronous transfer mode on a network, comprising the steps of:

receiving a series of cells of said traffic at a first buffer;

marking, prior to transmitting said series of cells, certain ones of said series of cells with a first token type according to a predetermined scheme depending on whether the cells violate negotiated admission rate and burst length constraints; and outputting said series of cells including said cells having said first token type to the network, whereby cells other than said cells with the first token type should not be dropped and said cells having said first token type may be dropped when said series of cells encounter congestion.

2. The method as claimed in claim 1, wherein said receiving step comprises receiving a series of cells of real-time type traffic and said marking step comprises marking certain ones of said series of cells according to a predetermined scheme so as to minimize the average cell gap should said cells be dropped due to congestion.

3. The method as claimed in claim 2, wherein said marking step comprises marking approximately every other cell of said series of cells, whenever an impending admission rate or burst length violation is detected.

4. The method as claimed in claim 2, wherein said receiving step comprises receiving a series of cells carrying voice data.

5. The method as claimed in claim 4, wherein said marking step comprises marking approximately every other cell of said series of cells, whenever an impending admission rate or burst length violation is detected.

6. The method as claimed in claim 1, wherein said receiving step comprises receiving a series of cells of nonreal-time type traffic and said marking step comprises marking certain ones of said series of cells according to a predetermined scheme when said series violates specific burst or admission rate constraints so as to maximize the average cell gap created should said series of cells encounter congestion and said cells having said first token type be dropped due to congestion.

7. The method as claimed in claim 1, wherein said receiving step comprises receiving a series of cells of data type traffic and said marking step comprises marking certain ones of said series of cells according to a predetermined scheme when said series violates specific burst or admission rate constraints so as to maximize the average cell gap created should said series of cells encounter congestion and said cells having said first token type be dropped due to congestion.

8. The method as claimed in claim 1, wherein said marking step comprises certain ones of said series of cells according to a predetermined scheme when said series violates specific burst or admission rate constraints so as to maximize the average cell gap should said certain ones of said series of cells are dropped when said series of cells encounter congestion.

9. The method as claimed in claim 1, wherein said receiving step comprises receiving a series of cells of data type traffic.

10. The method as claimed in claim 1, wherein said marking step comprises marking certain ones of said series of cells with a first token type from a token generator, wherein said token generator has a finite number of said first token type and is periodically replenished with said first token types.

11. The method as claimed in claim 1, wherein said marking step comprises marking as many cells as possible after a first of said certain cells are marked until no further of said cells can be marked or no impending admission rate or burst length violation is detected.

12. A method for controlling the average cell gap of traffic transported in asynchronous transfer mode on a network, comprising the steps of:

receiving a series of cells of said traffic at a first buffer;

marking, prior to transmitting said series of cells, certain ones of said series of cells with a first token type according to a predetermined scheme which depends on the type of traffic to be transmitted on the network; and outputting said series of cells including said cells having said first token type to the network, whereby cells other than said cells with the first token type should not be dropped and said cells having said first token type may be dropped when said series of cells encounter congestion.

13. The method as claimed in claim 12, wherein said marking step comprises marking, prior to transmitting said series of cells certain ones of said series of cells with a first token type according to a predetermined scheme depending on whether the cells violate negotiated admission rate or burst length constraints.

14. A system for controlling the average cell gap of traffic transported in asynchronous transfer mode on a network, comprising:

a packet buffer for receiving and storing a series of cells;

a delay and cell marker coupled to said packet buffer for receiving said series of cells and for delaying and marking certain ones of said series of cells in accordance with cell marking control signals and transmission delay control signals;

a decision logic unit coupled to said packet buffer and said delay and cell marker for receiving buffer state signals from said packet buffer and outputting first and second token control signals;

first and second token pool unit coupled to said decision logic unit, wherein said decision logic outputs cell marking control signals and transmission delay control signals which cause said delay and cell marker unit to mark certain ones of said cells with said first and second tokens in a manner such that if certain cells marked with said first tokens encounter congestion, said certain cells can be dropped and results in either maximizing or minimizing average packet gap of said series of cells.

\* \* \* \* \*